US009519762B2

(12) United States Patent
Williams et al.

(10) Patent No.: US 9,519,762 B2
(45) Date of Patent: *Dec. 13, 2016

(54) BEHAVIORAL BIOMETRICS FOR AUTHENTICATION IN COMPUTING ENVIRONMENTS

(71) Applicant: IGT, Reno, NV (US)

(72) Inventors: David C. Williams, Carson City, NV (US); Joseph Randy Hedrick, Reno, NV (US)

(73) Assignee: IGT, Las Vegas, NV (US)

( * ) Notice: Subject to any disclaimer, the term of this patent is extended or adjusted under 35 U.S.C. 154(b) by 986 days.

This patent is subject to a terminal disclaimer.

(21) Appl. No.: 13/707,340

(22) Filed: Dec. 6, 2012

(65) Prior Publication Data

US 2013/0123007 A1 May 16, 2013

Related U.S. Application Data

(63) Continuation of application No. 11/937,692, filed on Nov. 9, 2007, now Pat. No. 8,353,764.

(Continued)

(51) Int. Cl.
*A63F 9/24* (2006.01)
*G06F 21/31* (2013.01)
*G06F 21/36* (2013.01)

(52) U.S. Cl.
CPC ............... *G06F 21/31* (2013.01); *G06F 21/36* (2013.01)

(58) Field of Classification Search
CPC .. G07F 17/3241; G07F 17/3239; G06F 21/31; A63F 13/2145
See application file for complete search history.

(56) References Cited

U.S. PATENT DOCUMENTS 6,709,333 B1 3/2004 Bradford et al.
6,979,264 B2 12/2005 Chatigny et al.
(Continued)

FOREIGN PATENT DOCUMENTS

WO      WO 0177792 A2 * 10/2001 ............. G06F 21/36
WO      WO2008/061066      5/2008

OTHER PUBLICATIONS

PCT International Search Report and Written Opinion dated Sep. 23, 2008 issued in PCT/US2007/084450.

(Continued)

*Primary Examiner* — Steve Rowland
(74) *Attorney, Agent, or Firm* — Neal, Gerber & Eisenberg LLP

(57) ABSTRACT

Techniques for authenticating one or more entities are disclosed. Authentication can be performed based on one or more attributes associated with an image and/or input provided in connection with an image. The image is effectively provided for authenticating one or more entities associated with a computing environment. The attributes which can be measures include the manner in which an image has been created and/or traced by a person being authenticated. A person can initially register with an authentication system by creating and/or tracing an image. Subsequently, the person can be provided with the same, similar and/or completely different image in order to be authenticated by the authentication system. It will be appreciated that the image needs not be a signature or provide any personal information about the person being authenticated.

18 Claims, 22 Drawing Sheets

6B (1)

6B (2)

6B (3)

6B (4)

Related U.S. Application Data

(60) Provisional application No. 60/865,842, filed on Nov. 14, 2006.

(56) References Cited

U.S. PATENT DOCUMENTS

| | | | |
|---|---|---|---|
| 7,125,335 B2 | 10/2006 | Rowe | |
| 2002/0169021 A1 | 11/2002 | Urie et al. | |
| 2002/0176577 A1* | 11/2002 | Xu | G06F 3/0346 380/258 |
| 2003/0109306 A1 | 6/2003 | Karmarkar | |
| 2004/0192438 A1 | 9/2004 | Wells et al. | |
| 2004/0192442 A1 | 9/2004 | Wells et al. | |
| 2006/0046842 A1 | 3/2006 | Mattice et al. | |
| 2007/0021208 A1* | 1/2007 | Mao | G06F 3/017 463/36 |
| 2007/0150842 A1* | 6/2007 | Chaudhri | G06F 3/04883 715/863 |
| 2008/0150678 A1 | 6/2008 | Giobbi et al. | |
| 2009/0062008 A1 | 3/2009 | Karmarkar | |
| 2011/0183745 A1 | 7/2011 | Gagner et al. | |
| 2013/0137516 A1 | 5/2013 | Griswold et al. | |

OTHER PUBLICATIONS

Bromme et al., "Multifactor Biometric Sketch Authentication," BIOSIG 2003, Proceedings of the 1st Conference on Biometrics and Electronic Signatures of the GI Working Group BIOSIG, Jul. 24, 2003, XP009105575 Darmstadt, Germany.

Orozco et al., "Using Haptic Interfaces for User Verification in Virtual Environments," Virtual Environments, Human Computer Interfaces and Measurement System S, Proceedings of 2006 IEEE International Conference on, IEEE, PI, Jul. 1, 2006, pp. 25-30. XP031019083.

Varenhorst, Christopher, "Passdoodles; a Lightweight Authentication Method," Research Science Institute, Massachussetts Institute of Technology, Jul. 27, 2004, XP009105569.

Al-Zubi et al., "Using an Active Shape Structural Model for Biometric Sketch Recognition," Dagm Symposium 2003, 25th Pattern Recognition Symposium, Magdeburg, Germany, Sep. 12, 2003.

EP Communication mailed Aug. 13, 2010 issued in Application No. 07871443.3.

AU 1st Examiner's Report mailed Aug. 19, 2011 issued in Application No. 2007319329.

AU 2nd Examination Report dated Jul. 17, 2012 issued in Application No. 2007319329.

AU 3rd Examination Report dated Sep. 13, 2012 issued in Application No. 2007319329.

US Office Action dated Sep. 2, 2011 issued in U.S. Appl. No. 11/937,692.

US Final Office Action dated Feb. 16, 2011 issued in U.S. Appl. No. 11/937,692.

US Office Action dated Jun. 7, 2012 issued in U.S. Appl. No. 11/937,692.

US Notice of Allowance dated Oct. 29, 2012 issued in U.S. Appl. No. 11/937,692.

\* cited by examiner

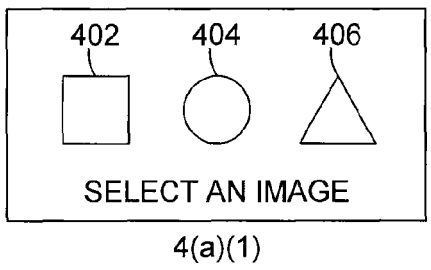
4(a)(1)
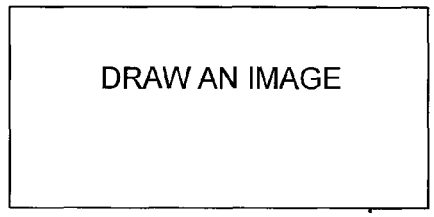
4(b)(1)
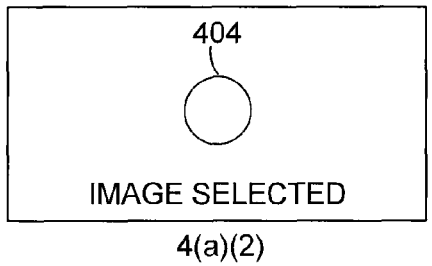
4(a)(2)
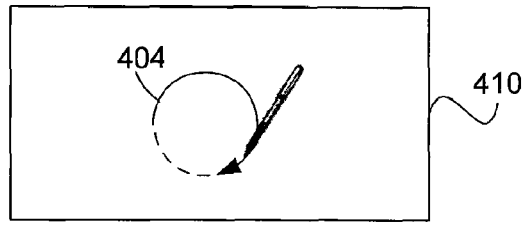
4(b)(2)
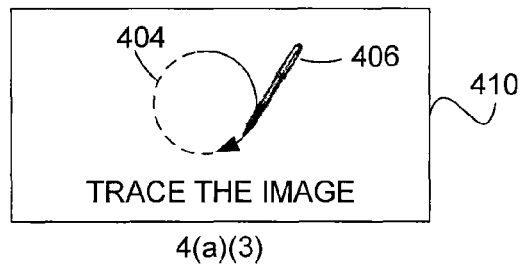
4(a)(3)
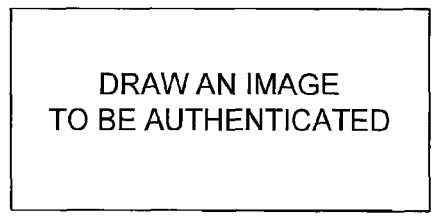
4(b)(3)
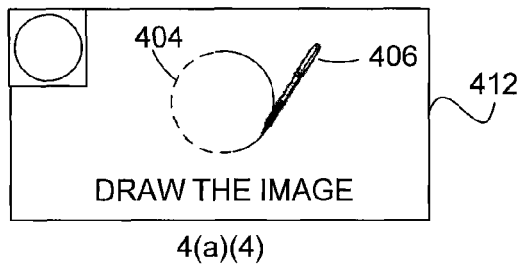
4(a)(4)
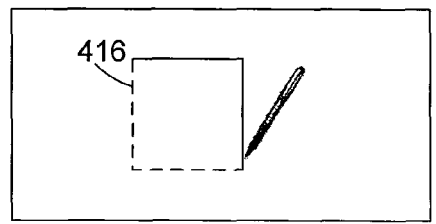
4(b)(4)
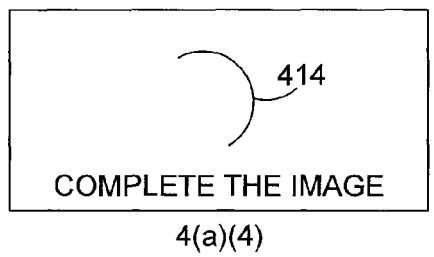
4(a)(4)
Figure 4B
Figure 4A

BEHAVIORAL BIOMETRICS FOR AUTHENTICATION IN COMPUTING ENVIRONMENTS

CROSS REFERENCE TO RELATED APPLICATION

This application is a continuation of U.S. patent application Ser. No. 11/937,692, filed Nov. 9, 2007, which claims benefit of U.S. Provisional Patent Application No. 60/865,842, filed on Nov. 14, 2006, both of which are hereby incorporated herein by reference in their entirety and for all purposes.

BACKGROUND OF THE INVENTION

Generally, authentication refers to the act of establishing or confirming something (or someone) as authentic. Typically, the process of authentication determines whether that claims made by or about someone or something are true. Authenticating an object may mean confirming its provenance, whereas authenticating a person often means verifying their identity.

In computer security, authentication generally refers to the process of attempting to verify the identity (e.g., digital identity) of an entity (e.g., a person, company, organization, group). For example, the sender of a communication such as a request to log in is authenticated. The sender being authenticated may, for example, be a person using a computer, a computer itself, or a computer program.

To distinguish authentication from the closely related term authorization, the shorthand notations A1 (authentication) and A2 (authorization) are occasionally used. The terms AuthN and AuthZ are also used to make this distinction in some communities. The problem of authorization is often thought to be identical to that of authentication as many widely adopted standard security protocols, obligatory regulations, and even statutes are based on this assumption. However, more precise usage describes authentication as the process of verifying an entity's (e.g., person's) identity, while authorization is the process of verifying that a known entity has the authority to perform a certain operation. As such, Authentication can precede authorization in such a manner as a person can be authenticated by showing proper identification to a bank teller prior to authorization for access to his or her bank account. However, the authenticated person would not be authorized to access someone else's account. Since authorization does not typically occur without authentication, the term is authorization can also refer to the combination of authentication and authorization.

Biometric authentication is a more recent development. Biometrics is generally known as the study of methods for uniquely recognizing humans based upon one or more intrinsic physical or behavioral traits. In information technology, biometric authentication typically refers to technologies that measure and analyze human physical and behavioral characteristics for authentication purposes. Examples of physical (or physiological or biometric) characteristics include fingerprints, eye retinas and irises, facial patterns and hand measurements, while examples of mostly behavioral characteristics include signature, gait and typing patterns. Generally, behavioral biometric characteristics can have a physiological component, and, to a lesser degree, physical biometric characteristics can have a behavioral element. Some researchers have coined the term behaviometrics for behavioral biometrics such as typing rhythm or mouse gestures where the analysis can be done continuously without interrupting or interfering with user activities.

Authentication is an important part of a secure computing environment. As the use of computing devices is ever increasing, improved authentication techniques would be greatly beneficial.

SUMMARY OF THE INVENTION

Broadly speaking, the invention relates to authentication techniques for authenticating one or more entities associated with a computing environment. In accordance with one aspect of the invention, authentication can be performed based on one or more attributes associated with an image effectively provided for authenticating one or more entities associated with a computing environment. It will be appreciated that the one or more attributes associated with the image can include at least one attribute associated with the manner the image has been created and/or traced. In one embodiment, a person initially registers with an authentication system by creating and/or tracing an image. For example, the authentication system can effectively measure one or more attributes associated with the manner in which a person creates and/or traces an image (e.g., measure the pressure, velocity and/or acceleration as a picture and/or text is drawn, written and/or traced). Those skilled in the art will appreciate that the attributes associated with the image can be stored and used for subsequent authentication of the person. For example, the person who has registered with the authentication system can be provided with the same, similar and/or completely different image for authentication. In one embodiment, the authentication system effectively measures one or more attributes associated with the manner the second image has been created and/or traced. The attributes can, for example, be compared with the attributes initially obtained in order to authenticate the user (e.g., a person can be authenticated by determining whether the difference between the measured values is within an acceptable rage).

In general, one or more attribute values for one more attributes associated with an image can be determined. The image has been provided for authentication of one or more entities associated with a computing environment. In one embodiment, a computing system can determine, identify and/or receive the one or more attributes values associated with the image and store them for subsequent authentication of the same one or more entities. The computing system can, for example, be a machine (e.g., server, gaming machine) operable in a gaming environment that provides one or more games for the one or more entities that are authenticated. Generally, an entity associated with a computing environment can be authenticated based on one more attributes associated with an image effectively provided for authentication of the one or more entities. In one embodiment, an authentication component and/or server is effectively provided for a gaming environment in order to authenticate one or more players based on one or more attributes associated with the manner the one or more players create and/or trace one or more images during a gaming session. It will be appreciated that the data can be retained only for the duration of the gaming session in accordance with one aspect of the invention.

The invention can be implemented in numerous ways, including a method, an apparatus, a computer readable medium. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 4A depicts an authentication process in accordance with one embodiment of the invention.

FIG. 4B depicts an authentication process in accordance with one embodiment of the invention.

DETAILED DESCRIPTION OF THE INVENTION

Figure 1A:
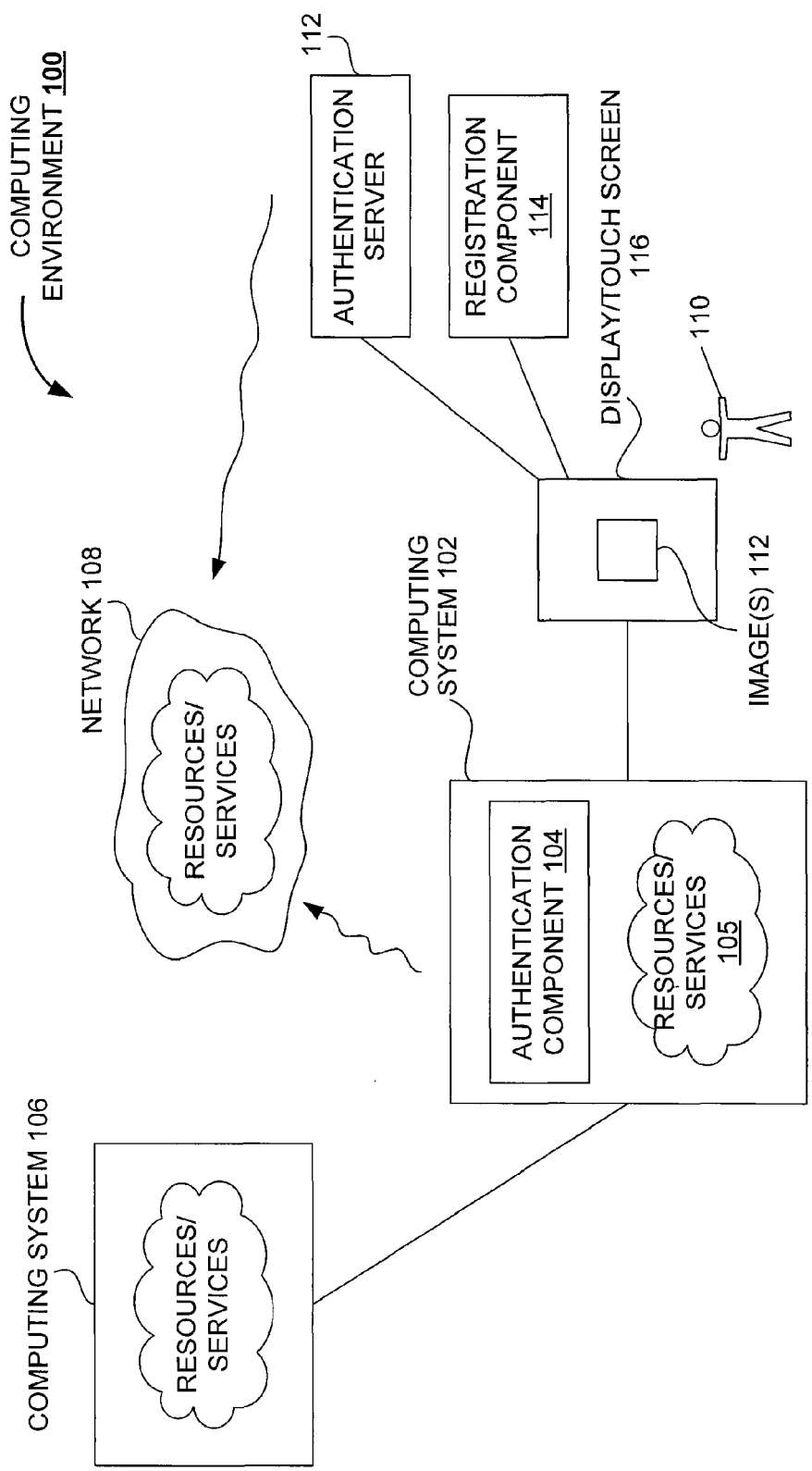
FIG. 1A depicts a computing environment in accordance with one embodiment of the invention.

As noted in the background section, authentication is an important part of a secure computing environment. As the use of computing devices is ever increasing, improved authentication techniques would be greatly beneficial. Modern gaming environments represent an example where the ever increasing use of computing machines (e.g., gaming servers) has resulted in more serious concerns about security. In particular, authentication of users of mobile devices is a serious security concern.

Conventionally, users (or players) of gaming environments interacted with a single gaming machine (or device). Typically, the gaming machine accepted a wager, the player's input, generated a gaming outcome, and displayed the outcome. The gaming machine either directly provided the user with the winning amount or provided an indication to the casino personnel to complete the transaction. In any case, the casino personal could directly verify the identity of the player and the winning outcome at the casino site.

More recently, gaming environments have begun to utilize server-based computers and computing techniques. Typically, server-based gaming ("SBG") systems distribute a portion of gaming operations to hardware and/or software not in the gaming machine (or device) used by the player. In other words, unlike conventional gaming environments, the player can be in a remote location with respect to the server that performs the gaming operations for the player. As such, more robust and reliable authentication systems need to be developed for the server-based gaming environments in order to, for example, more correctly associate each user activity with their identification, preference, and financial data stored elsewhere. In mobile gaming environments, accurately determining the identity of the player is also necessary to prevent the unauthorized operation of gaming devices by underage or otherwise unauthorized persons. The possibility that one user might successfully impersonate another in a restricted gaming environment presents a serious security challenge for SBG systems.

Another recent development is the advances in biometric authentication. Generally, biometric authentication can be more secure than traditional knowledge-based systems. Instead of relying on "something you know" (including passwords or PINs), sometimes in conjunction with "something you have" (such as a player tracking card), biometric systems can capture and distill an inherent user characteristic ("something you are") into suitable electronic format that can be stored and compared to subsequent user samples to verify that user's identity and authorize the requested gaming and/or other services (e.g., banking services, commerce services). "Hard" biometric (e.g., fingerprint, palm print, Iris, retinal pattern, voice, facial recognition), systems generally utilize immutable (or permanent) physical characteristics and therefore can raise many privacy concerns. One such concern is that hard biometric data can be difficult to reclaim, leading to fears that intimate and persistent identification data may be used in the future for unauthorized purposes. Although various governmental entities may require hard biometrics, capturing hard biometrics is not ideal in gaming environments where players are generally there for entertainment and less willing to allow their hard biometric data to be captured. Furthermore, some other forms of biometric data may not be ideal and/or suitable for gaming environments because they effectively identify a person, provide personal information about the person and/or have legal significance. Examples of such data include names, social security numbers, and legal signatures. Even though signatures are not as permanent as hard biometric data, some players do not feel comfortable with providing their signature for biometric authentication.

In a typical Information Technology (IT) biometric system, a person can initially register with the system. During the registration process one or more physical and/or behavioral characteristics can be obtained. This information can then be processed by an algorithm which reduces the data to a numerical value which comprises a unique digital representation of the obtained biometric information. If the user is new to the system, this digital template is entered into a secure authentication database. Each subsequent attempt to authenticate the user requires the biometric of the user to be captured again and identically processed into another digital template. That template is then compared to those existing in the database to determine a match. The process of converting the acquired biometric into a digital template for comparison is completed each time the user attempts to authenticate to the system. The comparison process involves the use of a Hamming distance. This is a measurement of how similar two bit strings are. For example, two identical bit strings have a Hamming Distance of zero, while two totally dissimilar ones have a Hamming Distance of one. Thus, the Hamming distance measures the percentage of dissimilar bits out of the number of comparisons made. Ideally, when a user logs in, nearly all of his features match; when someone else tries to log in their data does not fully match and the system will not allow the new person to log in. Current technologies have widely varying Equal Error Rates, varying from as low as 60% and as high as 99.9%.

Performance of a biometric measure is usually referred to in terms of the false accept rate (FAR), the false non-match or reject rate (FRR), and the failure to enroll rate (FTE or FER). The FAR measures the percent of invalid users who are incorrectly accepted as genuine users, while the FRR measures the percent of valid users who are rejected as impostors. In real-world biometric systems the FAR and FRR can typically be traded off against each other by changing some parameter. One of the most common measures of real-world biometric systems is the rate at which both accept and reject errors are equal: the equal error rate (EER), also known as the crossover error rate (CER). The lower the EER or CER, the more accurate the system is considered to be.

It will be appreciated that most behavioral biometric data can be intimately linked to a very specific task performed by a user. Moreover, a specific task can be chosen so that it is not extensible to other authentication activities even if the activities are very similar. As such, authentication systems that use behavioral biometric data are well suited for non-governmental activities (e.g., gaming activities) where privacy can be a major concern of players. Furthermore, it will be appreciated that behavioral biometric systems can be safer than traditional systems. Unlike knowledge based systems, where a password (or personal identification number commonly know as a "PIN") and/or player tracking card can easily be passed from one user to another, behavioral biometric identification criteria cannot be effectively transferred between users. In general, biometric systems can be made safer than the traditional systems. Latex fingerprint duplicates, glass eyeballs, and similar devices which purportedly circumvent hard biometric security are being countered by adding heat and moisture sensors to biometric scanners, rendering most attempts to defeat such systems ineffective. As difficult as transferring physical biometric data has become, transferring intangible behavioral data is even more problematic. One user cannot ascertain, let alone describe to another user, all of his or her characteristics with respect to the particular behavior being measured for authentication. This effectively prevents user impersonation to an even greater degree than with hard biometrics.

Authentication is an important part of e-commerce systems where server-client transmission of user data is employed. Authentication is also critical to further development of server-based environments, especially when mobile gaming systems are to be used. In accordance with one aspect of the invention, authentication can be performed based on one or more attributes associated with an image provided for authentication of one or more persons. It will be appreciated that the attribute(s) can effectively measure the dynamics of creating the image (e.g., drawing a picture, writing text). The dynamics of writing and/or drawing style is a biometric particularly well-suited for various environments where privacy and misuse is a concern of users (e.g., gaming environments). Authentication can be performed based on the dynamics of a user's writing and/or drawing style. As with a written signature, each person's writing or drawing exhibits unique characteristics, including velocity, acceleration, and pressure. However, the image used for authentication can be arbitrarily selected and have no relation to a persons real identity. Even if compromised, the image selected to measure the behavioral biometric has no inherent value. Furthermore, the data gleaned from a unique writing and/or drawing sample is generally valid only for that precise sample and may not be accurately extrapolated to any different writing sample (future or past). It will be appreciated that there is no need to retain data for future authentication of a person. By way of example, biometric data can be retained by this system only for the duration of a particular gaming session. It would be appreciated that these principles and practices mitigate privacy concerns associated with use of signatures or permanent physical characteristics for authentication.

The invention pertains to authentication techniques for authenticating one or more entities associated with a computing environment. In accordance with one aspect of the invention, authentication can be performed based on one or more attributes associated with an image effectively provided for authenticating one or more entities associated with a computing environment. It will be appreciated that the one or more attributes associated with the image can include at least one attribute associated with the manner the image has been created and/or traced. In one embodiment, a person initially registers with an authentication system by creating and/or tracing an image. For example, the authentication system can effectively measure one or more attributes associated with the manner in which a person creates and/or traces an image (e.g., measure the pressure, velocity and/or acceleration as a picture and/or text is drawn, written and/or traced). Those skilled in the art will appreciate that the attributes associated with the image can be stored and used for subsequent authentication of the person. For example, the person who has registered with the authentication system can be provided with the same, similar and/or completely different image for authentication. In one embodiment, the authentication system effectively measures one or more attributes associated with the manner the second image has been created and/or traced. The attributes can, for example, be compared with the attributes initially obtained in order to authenticate the user (e.g., a person can be authenticated by determining whether the difference between the measured values is within an acceptable rage).

In general, one or more attribute values for one more attributes associated with an image can be determined. The image has been provided for authentication of one or more entities associated with a computing environment. In one embodiment, a computing system can determine, identify and/or receive the one or more attributes values associated with the image and store them for subsequent authentication of the same one or more entities. The computing system can, for example, be a machine (e.g., server, gaming machine, or other electronic device) operable in a gaming environment that provides a user interface to interact with one or more games for the one or more entities that are authenticated. Generally, an entity associated with a computing environment can be authenticated based on one more attributes associated with an image effectively provided for authentication of the one or more entities. In one embodiment, an authentication component and/or server is effectively provided for a gaming environment in order to authenticate one or more players based on one or more attributes associated with the manner the one or more players create and/or trace one or more images during a gaming session. It will be appreciated that the data can be retained only for the duration of the gaming session in accordance with one aspect of the invention.

Embodiments of these aspects of the invention are discussed below with reference to FIGS. 1A-11. However, those skilled in the art will readily appreciate that the detailed description given herein with respect to these figures is for explanatory purposes as the invention extends beyond these limited embodiments.

FIG. 1A depicts a computing environment 100 in accordance with one embodiment of the invention. Referring to FIG. 1A, a computing system 102 effectively provides an authentication component (or module) 104 for authenticating one or more entities (e.g., persons, groups, users). Typically, an entity is authenticated in order to authorize access to the resources and/or services provided by and/or accessible from the computing environment 100. These resources and/or services can, for example, be provided by and/or accessible via the computing system 102, another computing system 106, and/or network 108. In any case, the authentication component 104 can be used to effectively authenticate the one or more entities 110. Further, based on this authentication process, access to resources and services can be granted or denied.

By way of example, a resource and/or service 105 can be effectively provided to one or more persons 110. The service and/or resource 105 can be authorized based on the result of an authentication process performed by the authentication component 104. Initially, one or more persons 110 can effectively register with the authentication component 104. This registration (or pre-authentication process) can be achieved in connection with one or more images (e.g., pictures, text and/or phrases). It will be appreciated that an image can be used to effectively authenticate the person(s) 110 even though the image does not provide any information regarding the person(s) 110. More specifically, one or more attributes (or aspects) of the image can be used to characterize an entity for the purpose of authenticating the entity. Typically, an image can be created, traced and/or selected by a person during the registration process. As such, the image can effectively represent behavioral patterns associated with a person.

During the registration process, the authentication component 104 can determine one or more values for one or more attributes associated with an image. Broadly speaking, an attribute associated with an image can include a feature and/or aspect of the image (e.g., shape, size, type). It will be appreciated that attributes associated with an image can also include attributes associated with the manner in which an image has been created (e.g., drawn, written) and/or traced, for example, by the persons 110. The one or more attributes associated with the image can, for example, be determined as a person creates or traces an image. As such, the authentication component 104 can measure one or more attribute (or parameter) values associated with the manner in which the image is created and/or traced as a picture is drawn and/or text is written. Those skilled in the art will appreciate that the one or more attributes can, for example, be associated with the velocity, acceleration, pressure, the average time and/or total time taken to create and/or trace one or more images. Those skilled in the art will also appreciate that one or more attributes associated with the manner in which an image is created and/or traced can be quantified and stored as data. It will also be appreciated that the one or more attribute values can be obtained for the authentication of the person(s) 110 in a non-intrusive manner that does not require requesting or storing personal information such as legal signatures and fingerprints. In fact, there is no need to even store the image used to register a person. In other words, only attribute values associated with an image need to be stored and subsequently used to authenticate a person in order to, for example, determine whether to grant or deny access to resources and/or services provided by and/or accessible in the computing environment 100. Furthermore, even the attribute values effectively used to authenticate an entity can be deleted after the authentication process in accordance with one aspect of the invention. By way of example, attribute values can be determined and retained only for the duration of a gaming session.

After registering with the authentication component 104, an authentication process can effectively authenticate an entity, for example, one or more persons 110 who have registered with the authentication component 104. By way of example, this authentication process can also be performed by the authentication component 104. During the authentication process, one or more persons 110 could be required to draw and/or trace the same, similar and/or a completely different image than the image initially used during the registration process so that the one or more attributes (or parameters) associated with the manner the image is drawn and/or traced can be measured. The values measured during the authentication process can be compared to those initially obtained when the person effectively registered with the authentication component 104. Based on the comparison, one or more persons 110 can be authenticated. By way of example, one or more attributes (or parameters) can be measured as a picture is drawn and/or traced by the person(s) 110. These attributes can be the same as or similar to those measured during the registration process. As such, the values obtained for one or more attributes during the registration process can, for example, be compared to the corresponding values for the one or more attributes obtained during the authentication process. Typically, registration process is performed prior to the authentication process. However, the registration is not necessary. In general, authentication can be done solely based on the attributes determined during the authentication process. As such, it is not necessary to even register with the authentication component 104 as it is possible to, for example, make the authentication based on one or more predetermined attribute values. By way of example, members of a group can be authenticated if they exhibit a common characteristic (e.g., draw a particular picture in between 1 to 2 minutes).

It should be noted that the registration and/or authentication process can be provided by various other components in the computing environment 100. For example, an authentication server 112 can perform the authentication and registration processes. It should be noted that the one or more persons 110 can, for example, register with a registration component 114 and subsequently be authenticated by the authentication component 104. Also, the one or more persons 110 can effectively interact with a Graphical User Interface (GUI) that includes a display and/or touch screen 116 provided for displaying one or more images 112.

Figure 1B:
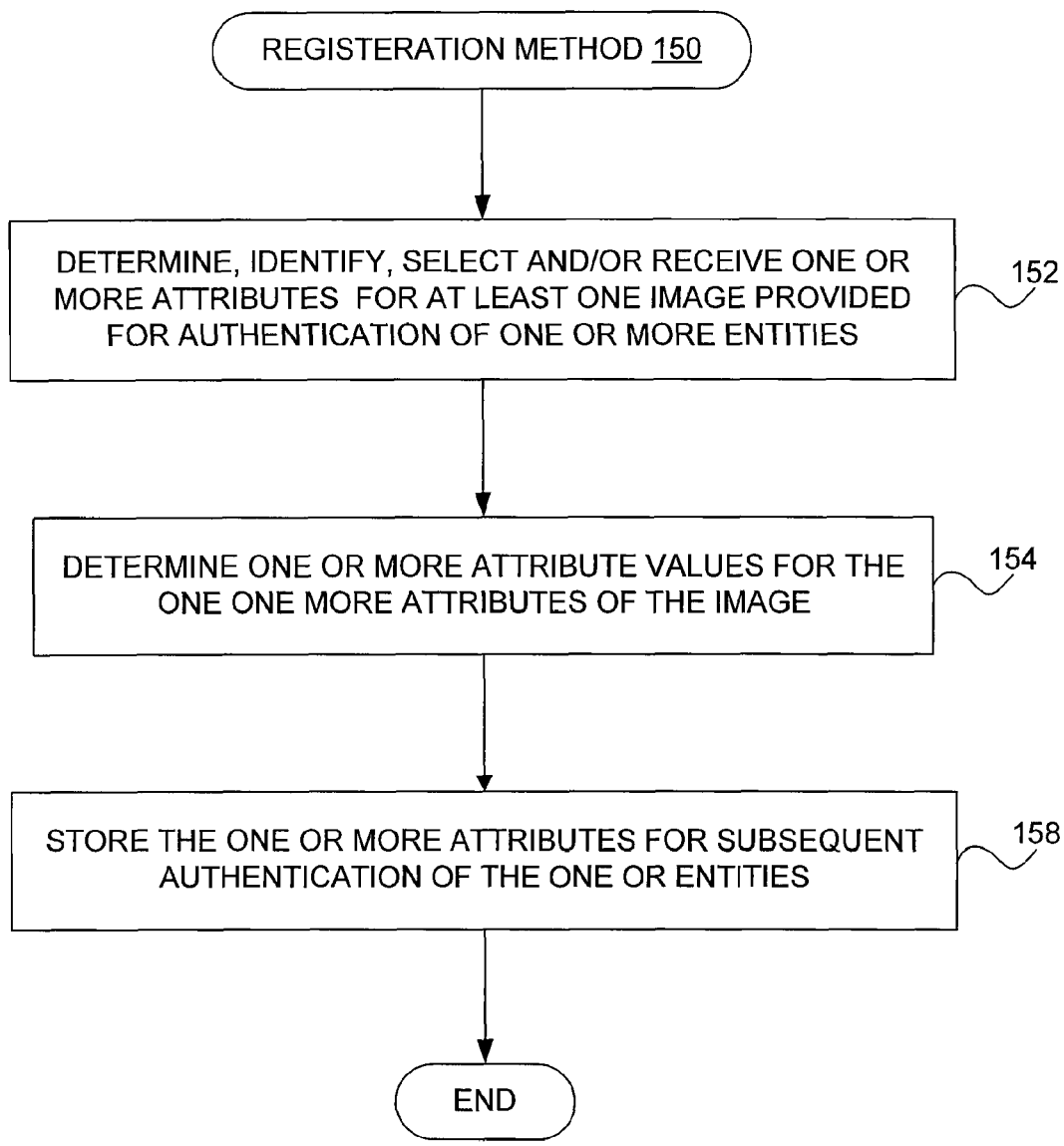
FIG. 1B depicts for registering method for registering an entity for subsequent authentication in accordance with one embodiment if the invention.

FIG. 1B depicts method 150 for registering an entity for subsequent authentication in accordance with one embodiment of the invention. Referring to FIG. 1B, initially, one or more attributes of an image are determined, identified, selected and/or received (152). The image is provided for authentication of one or more entities. The one or more attributes of the image can, for example, define one or more aspects or characteristics of the image and/or the manner the image has been created (e.g., size of the image, pressure, velocity, acceleration used to create the image). Those skilled in the art will appreciate that the one or parameters can, for example, be predetermined (e.g., preprogrammed), received as input and/or determined dynamically based on the image and/or the entities to be authenticated. In any case, one or more values for the one or more attributes of the image are determined (154). Finally, the one or more attribute values are stored (158) for subsequent authentication of the entity and the registration method 150 ends.

Figure 1C:
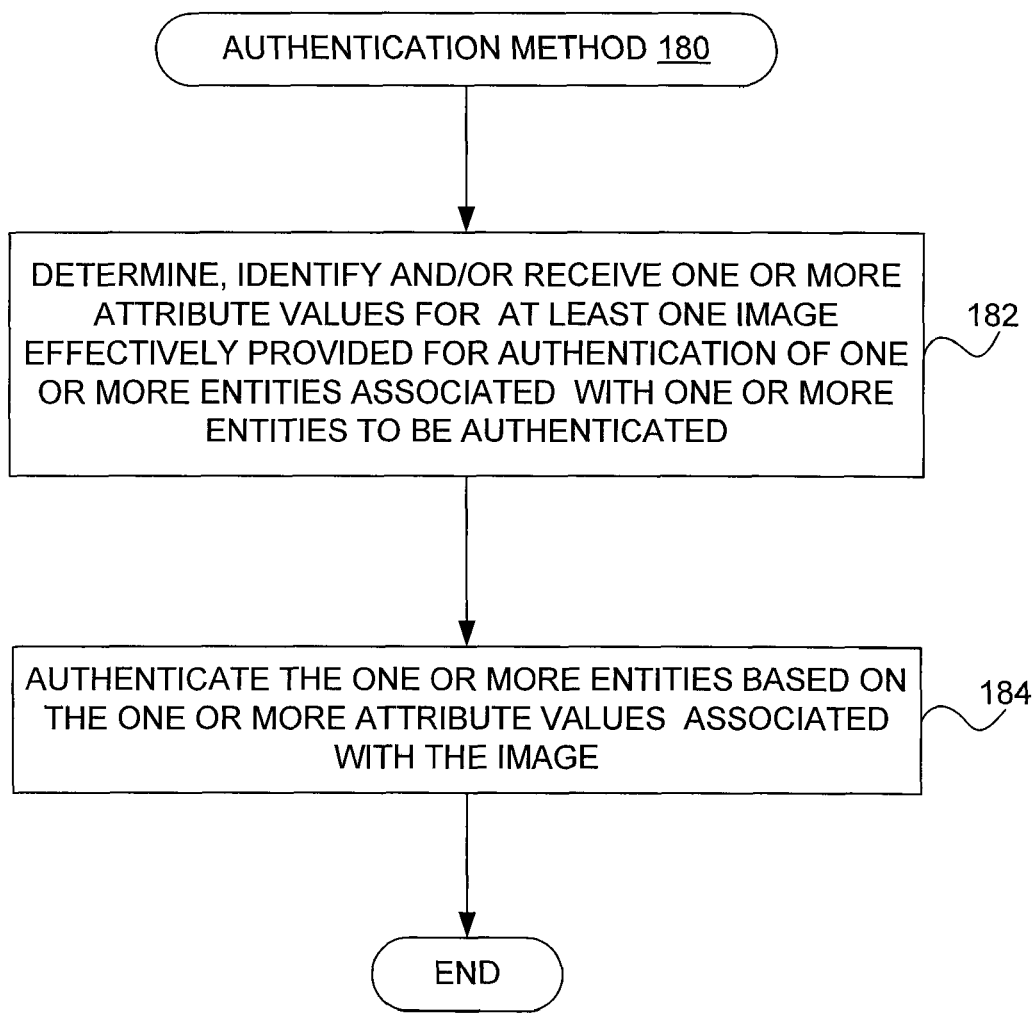
FIG. 1C depicts an authentication method for authentication one or more entities in a computing environment.

FIG. 1C depicts an authentication method 180 for authentication one or more entities associated with a computing environment in accordance with one embodiment of the invention. Initially, one or more attribute values for one or more attributes of an image are determined, identified and/or received (182). The one or more attribute values are associated with the one or more entities to be authenticated. After determining, identifying and/or receiving (182) the one or more attribute values of the image, the one or more entities are authenticated (184). It should be noted that the one or more entities are authenticated based on the one or more attributes values of the image. By way of example, the attribute value(s) can be compared with those initially obtained during a registration process and/or compared to one or more threshold values. In any case, one or more entities are authenticated based on the attribute values of the image. The image can be effectively received, identified, selected and/or determined during the authentication method 180. Typically, the image is created and/or traced by a person. As such, the one or more attribute values can be measured for the image as the image is being created and/or traced. Similar to the registration method 150 (FIG. 1B), the attributes can be selected, determined, identified and/or received. Typically, the attributes are the same as those used in a registration process registration can be used as a base line for subsequent authentication.

Figure 2A:
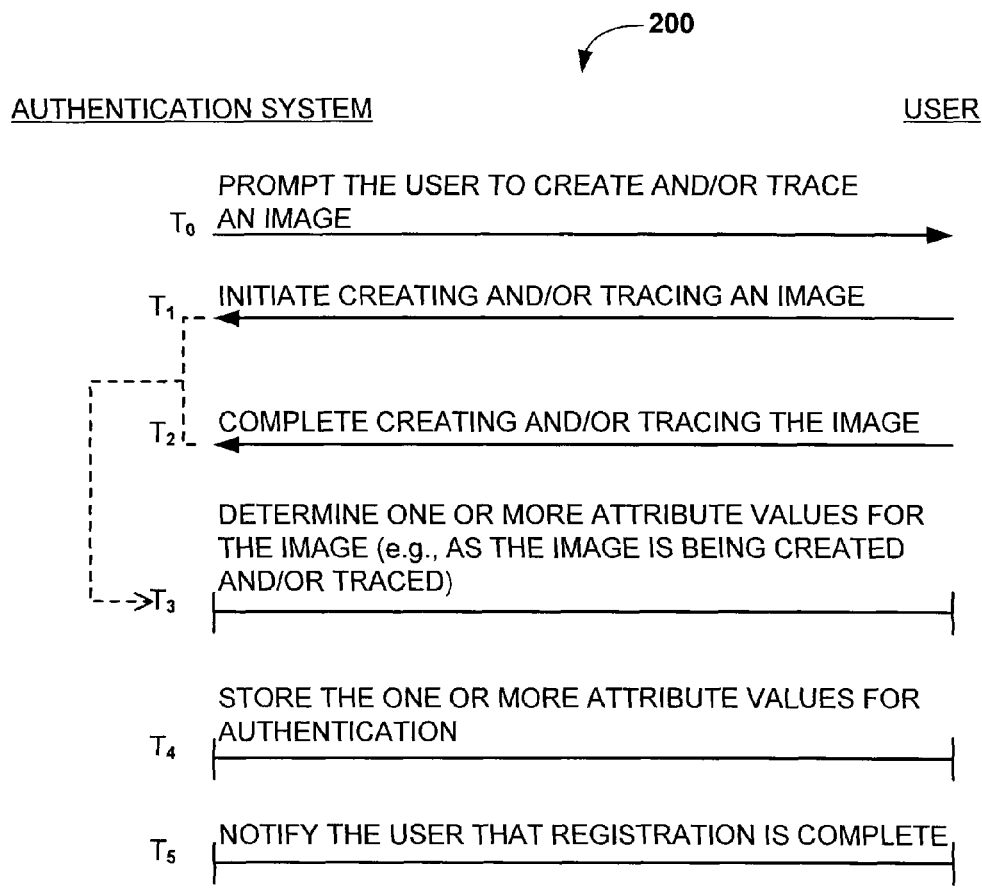
FIG. 2A depicts a flow chart illustrating a registration process in accordance with one embodiment of the invention.
Figure 2B:
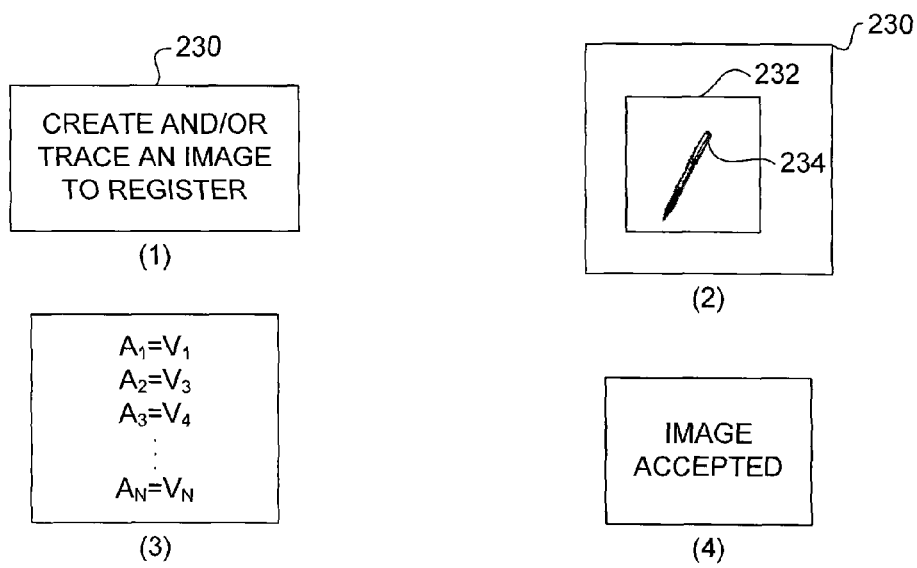
FIG. 2B demonstrates that the user can be prompted on a display to create and/or trace an image.

FIG. 2A depicts a registration process 200 in accordance with one embodiment of the invention. The registration process 200 can, for example, authenticate an end-user (or user) with an authentication system. Referring to FIG. 2A, initially, at time $T_0$, a user is prompted by the authentication system (or requested) to create and/or trace an image. The user can, for example, be a person that plans to use the resources and/or services of a computing environment. Referring now to FIG. 2B (1), the user can, for example, be prompted on a device screen 230 to create and/or trace an image. The image can, for example, be created and/or traced on a touch screen (230). Referring back to FIG. 2A, at time $T_1$, user initiates creating and/or tracing an image. Referring now to FIG. 2B (2), the user can, for example, draw or trace an image 232 on the touch screen (230) using a stylus (or electronic pen) 234. At a time $T_2$, the user completes creating and/or tracing the image 232 (see FIG. 2A). It should be noted that between the time that the image is initiated ($T_1$) and completed ($T_2$), one or more attribute values associated with the image can be determined. By way of example, one or more attributes associated with the manner the image has been created and/or traced can be measured. Referring to FIG. 2A, at a time $T_3$, one or more attribute values for the image are determined. As suggested by FIG. 2A, the one or more attribute values can, for example, be measured as the image is being created and/or traced. In any case, the attribute(s) are stored for authentication at a time $T_4$. Referring to FIG. 2B (3), the one or more attribute values ($V_1, \ldots V_n$) can, for example, be stored for a set of attributes ($A_1, \ldots, A_n$) associated with the image 232. Finally, at a time $T_5$, the user is notified that the registration is complete. Referring to FIG. 2B (4), the user can be notified that the image is accepted. In general, the attribute values can be determined between times $T_1$ and $T_2$ when the image is being created and/or traced or after time $T_2$ when the image has been completed.

Those skilled in the art will appreciate that the timing depicted in FIG. 2A is exemplary. As such, the time line can vary. For example, the user may be notified before storing the attribute values.

Figure 2C:
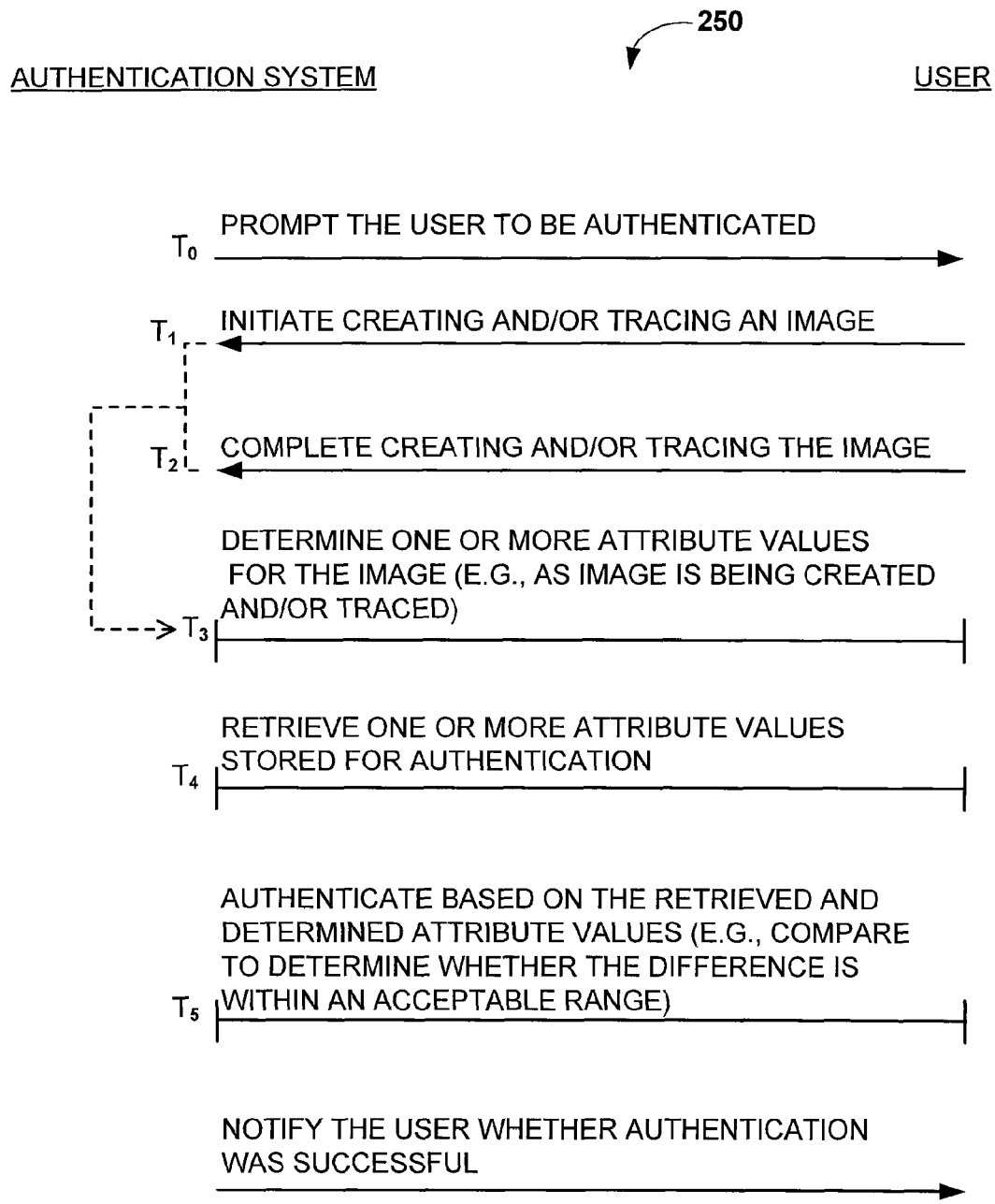
FIG. 2C depicts an authentication process in accordance with one embodiment of the invention.

FIG. 2C depicts an authentication process 250 in accordance with one embodiment of the invention. The authentication process 250 can, for example, be performed by an authentication system to authenticate an end-user (or user). Initially, at time $T_0$, the user is prompted (or requested) to be authenticated, for example, by creating and/or tracing an image. At time $T_1$, the user initiates creating and/or tracing an image and completes it at time $T_2$. At time $T_3$, one or more attribute values fro one or more attributes of the image are determined. These attributes can be determined (e.g., measured) in a similar manner as noted above with respect to FIG. 2B.

Referring back to FIG. 2C, at time $T_4$, one or more attribute values which have been stored for authentication are retrieved. Typically, the attribute values are obtained during the registering process. However, these values can be generally determined based on a criterion and stored for authentication. At time $T_5$, authentication is performed based on the retrieved and determined attribute values. By way of example, the attribute values retraced at time $T_4$ can be compared to the attribute values determined at time $T_3$ in order to determine whether the difference is within an acceptable range. Finally, at time $T_6$, the user is notified whether the authentication was successful.

Figure 2D:
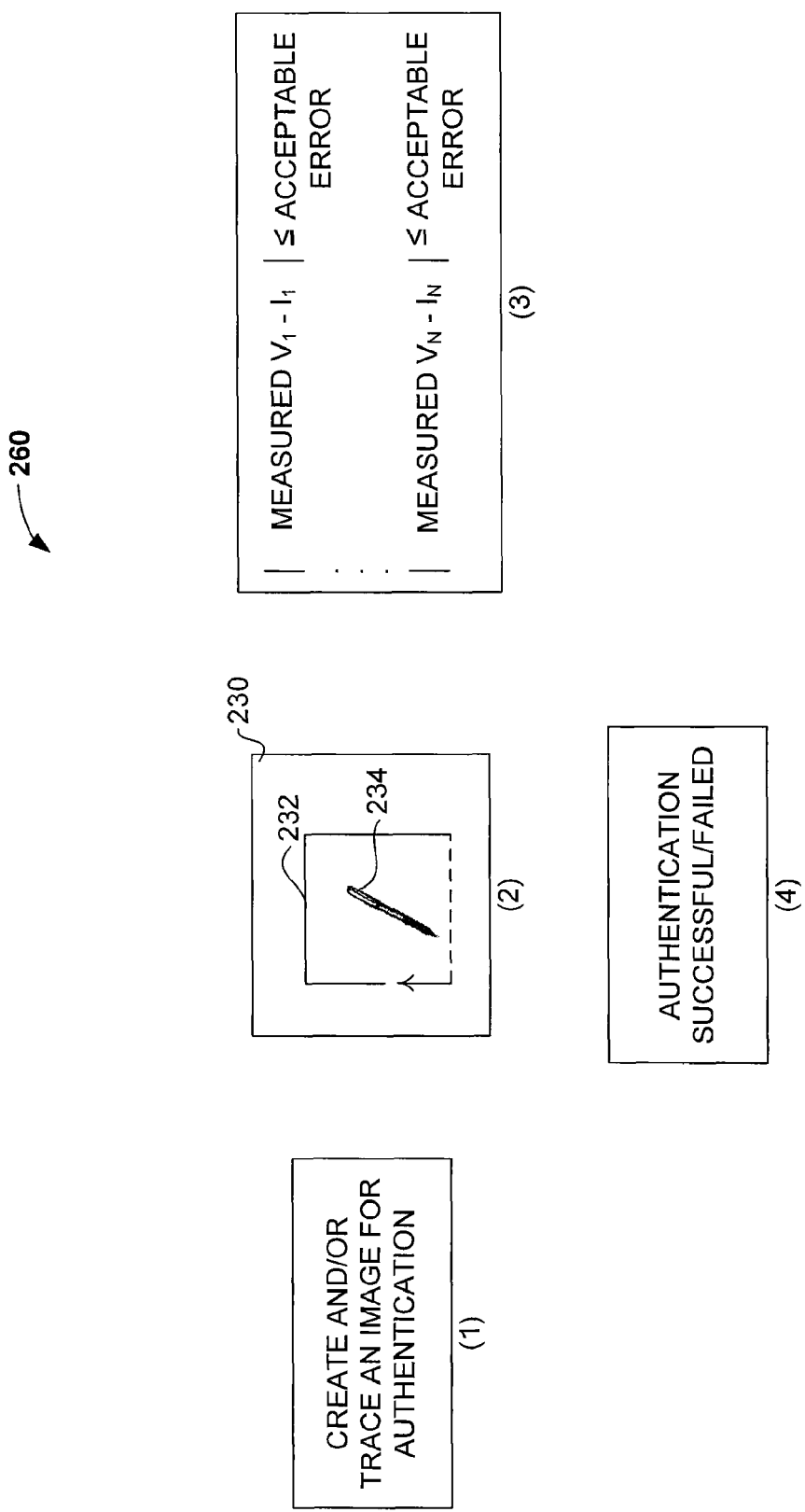
FIG. 2D depicts an authentication process in accordance with one embodiment of the invention.

FIG. 2D depicts an authentication process 260 in accordance with one embodiment of the invention. Referring to FIG. 2D(1), a user is effectively prompted to create and/or trace an image for authentication of the user. As shown in FIG. 2D(2), an image 232 can be created using, for example, a stylus 234 on a touch screen 230. One or more attribute values ($V_1, \ldots, V_n$) can be measured as the image 232 is being created and/or traced. Subsequently, the measured attribute values ($V_1, \ldots, V_n$) are effectively compared with base-line values ($I_1, \ldots, I_n$). The base-line values can, for example, be obtained when the user initially registers with an authentication system. Finally, depending on the result of the comparison, the user can be notified as to whether the authentication was successful or failed.

Figure 3A:
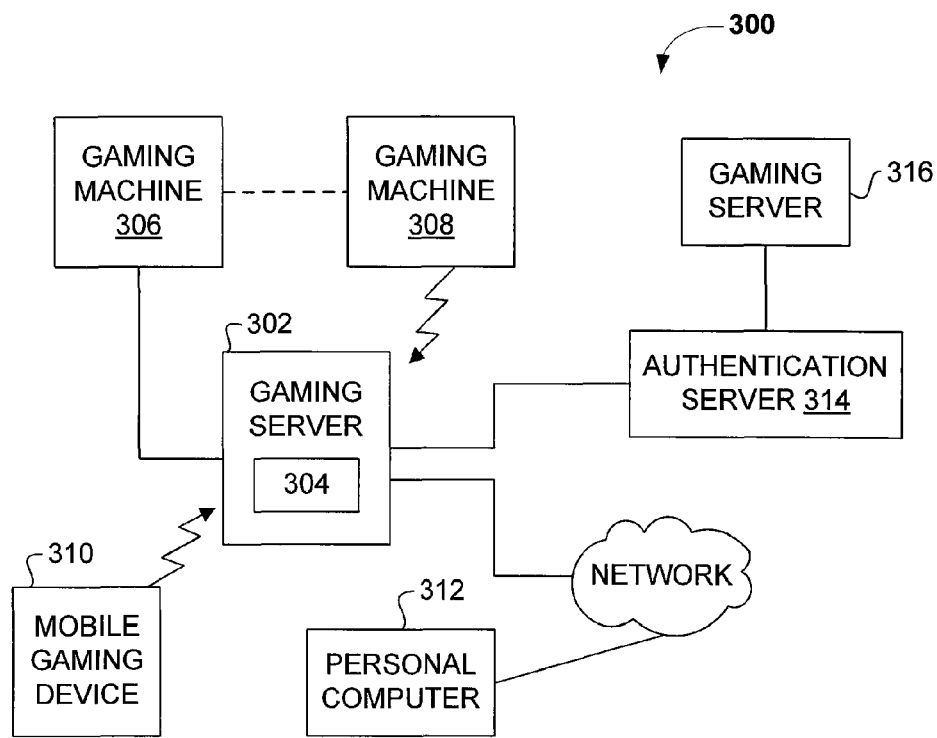
FIG. 3A depicts a gaming environment in accordance with one embodiment of the invention.

The authentication techniques described above are suitable for any computing environment. Gaming environments are an example of a computing environment that can highly benefit from using the invention. To further elaborate, FIG. 3A depicts a gaming environment 300 in accordance with one embodiment of the invention. Referring to FIG. 3A, a gaming server 302 can effectively provide an authentication component (or module) 304 for authentication of various entities in the gaming environment 300. Typically, the entities include one or more persons (or players) that seek to play one or more games individually or as a group. A person can use a variety of devices, for example, gaming machines 306 and 308, a mobile and/or wireless gaming device 310, and/or a personal computer 312. The gaming machines 306 and 308 can, for example, be in the same casino and/or network, or in remote locations with respect to each other. Typically, each of the gaming devices 306, 308, 310 and 312 are operable for playing one or more games. The games can be stored locally on the gaming device and/or on the gaming server 302. The outcome of a game can be determined by a gaming machine or device and/or the gaming server 304. In any case, the authentication component 304 can effectively authenticate an entity (e.g., a player who seeks to access the gaming resources and/or services which are provided by the gaming environment 300 and/or external services (e.g., banking) which may be accessible via the gaming environment 300). It should be noted that the authentication can effectively be provided by an authentication server 314. In other words, authentication can be separated from the general gaming services provided by the gaming server 304. The authentication server 314 can, for example, be a server specifically provided for authentication. As such, the authentication server 314 can effectively provide authentication services for various other gaming devices and/or gaming environments (not shown). These other devices and/or gaming environments can, for example, be served by another gaming server 316 (not shown). Conceptually, the authentication component 304 can be represented by a number of subcomponents (or modules).

Figure 3B:
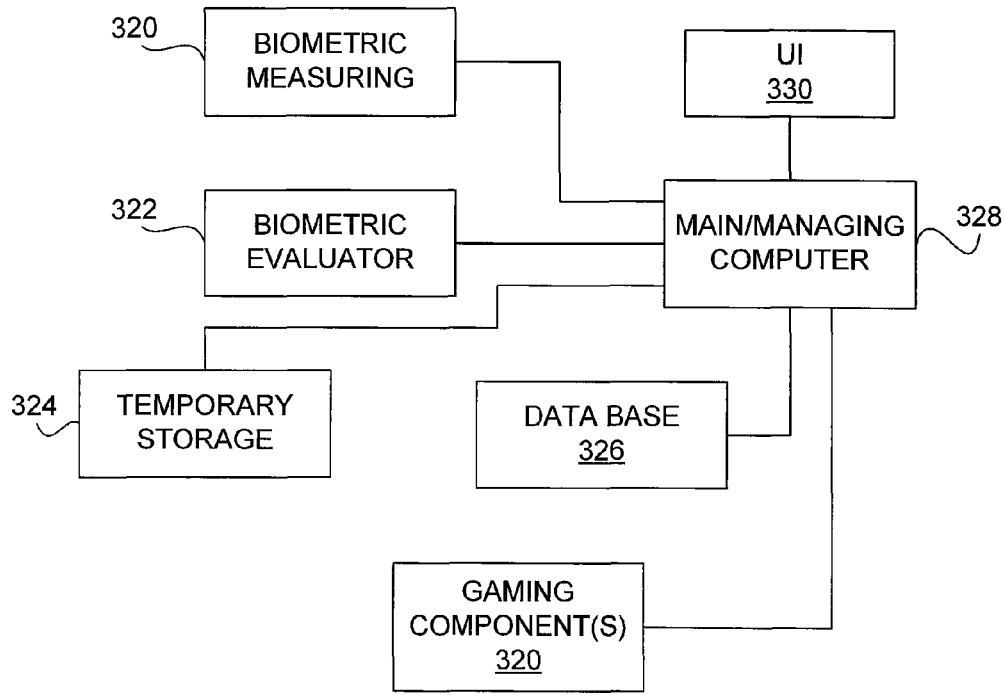
FIG. 3B depicts an authentication module in accordance with one embodiment of the invention.

FIG. 3B depicts an authentication module in accordance with one embodiment of the invention. Referring to FIG. 3B, biometric measuring 320 and evaluator 322 can respectively measure and evaluate biometric attributes, features or aspects of an image provided for authentication of an entity. Typically, the image is created and/or traced by a person. As such, the biometric measuring component 320 can, for example, measure one or more attributes associated with the image including the manner in which the image is created and/or traced. The measured attributes can be temporarily and/or persistently saved in a temporary storage 324 and/or database 326. It will be appreciated that the biometric measuring component 320 can be used for both the registration and authentication processes. The biometric evaluator 322 can evaluate (e.g., compare) values measured by the biometric measuring component 320. Based on this evaluation, a player can be authenticated. By way of example, the difference between the measured values can be considered. Typically, the biometric evaluator 322 is used during the authentication process. A main (or managing) component 328 can effectively manage the registration and authentication process. In addition, the main component 328 can communicate and/or manage gaming components 320 providing various gaming services (e.g., games). A User Interface (UI) component 330 can effectively provide a user interface for interacting with the authentication system 300.

Figure 3C:
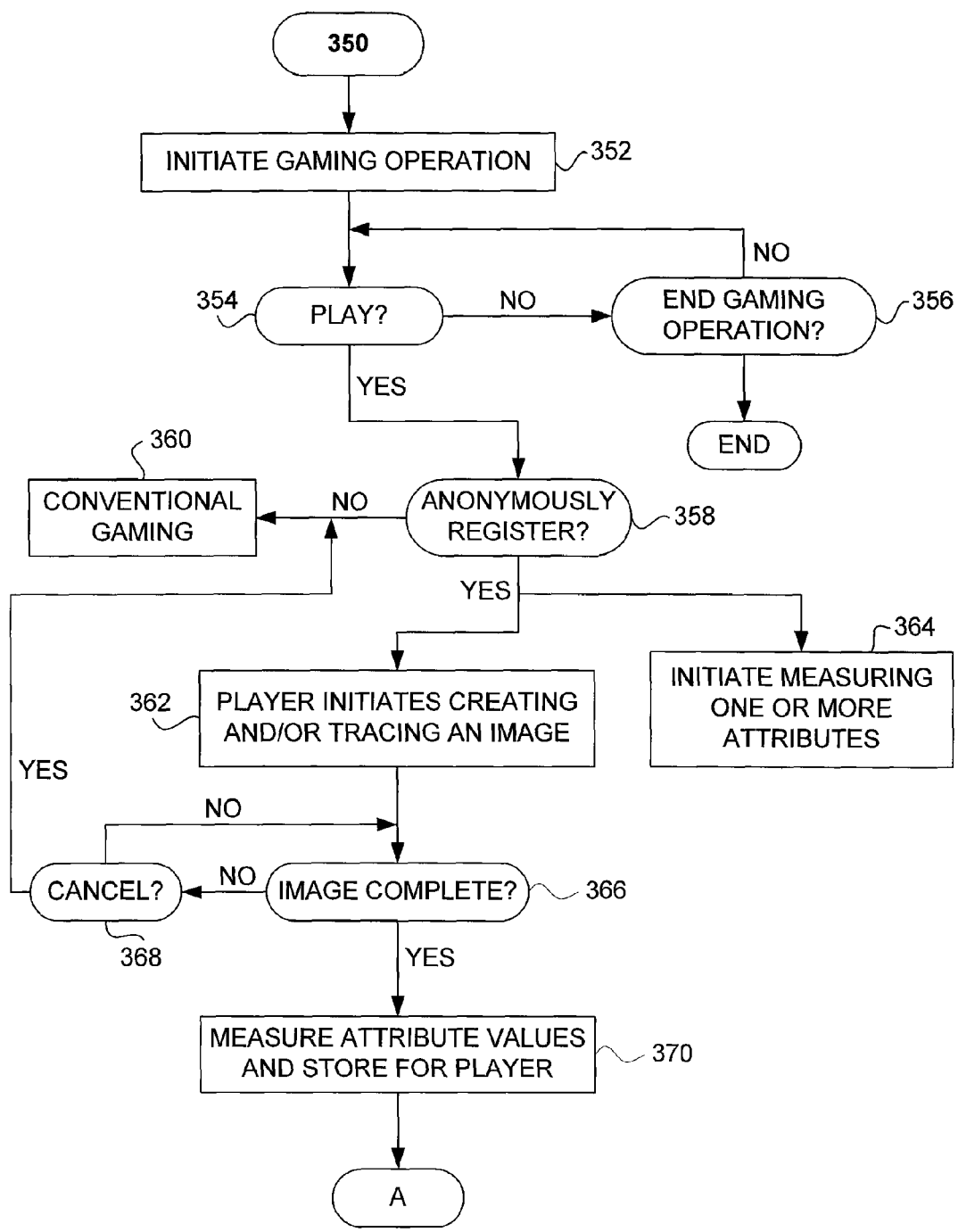
FIG. 3C depicts a method for authenticating a player in a gaming environment in accordance with one embodiment of the invention.

FIG. 3C depicts a method 350 for authenticating a player in a gaming environment in accordance with one embodiment of the invention. Initially, gaming operations are initiated (352). By way of example, a gaming machine or mobile gaming device can be powered on and/or gaming software can be initiated. Next, it is determined (354) whether a game is to be played. By way of example, a player may initiate playing a game by inserting cash, or a card into a gaming machine, or go through a sign in (or login) process via a mobile device and provide the information needed to start playing a game. In effect, the method 350 can wait for a game to be initiated or end if it is determined (356) to end the gaming operations. The gaming operation can, for example, end when a user or administrator decides to log off or shut down the system. When game play is initiated (354) it is determined (358) whether to register the player anonymously for subsequent authentication of the player. Initially, the player may go through a registration process, provide funds, and/or identify a credit card account as may be required by gaming regulations. Depending on the level of security and/or gaming regulations, the registration process may be a relatively rigorous process designed to verify the identity of a person who initially registers with the authentication system. However, it will be appreciated that the registration process allows the player to be subsequently authenticated without requiring the player to go through a vigorous authentication process or requiring the user to submit personal information about him/herself.

By way of example, the player may be asked whether he or she would like to register with an authentication system. If it is determined (358) not to register the player, conventional gaming operations can be performed (360). However, if it is determined (358) to register the player, the player starts (362) to create and/or trace an image, and one or more attributes associated with the image are measured (364). The attributes can include the manner in which the image is created and/or traced. In effect, the player can complete the image (366) or cancel (368) the registration process for conventional gaming. If it is determined (366) that the image is complete, one or more attribute values are measured and stored (370) for the player. At the point the registration of the player is complete. It should be noted that the identity of the player can remain anonymous as the image need not have any.

Figure 3D:
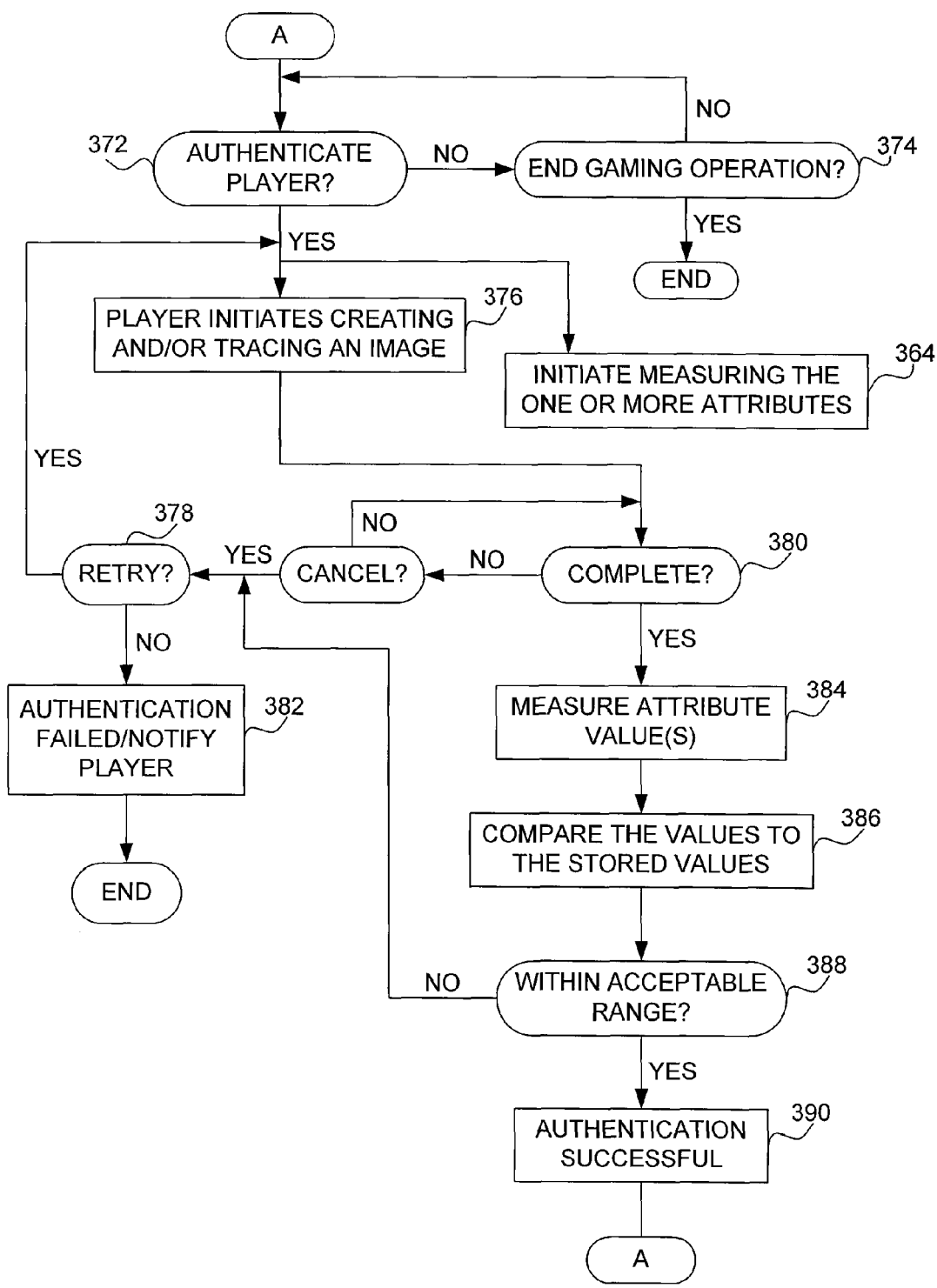
FIG. 3D depicts an authentication module in accordance with one embodiment of the invention.

After the registration process, the player can start playing one or more games. At the same point there may be a need to authenticate the player. By way of example, the player may initiate a transaction for more credits or win a prize that may require authentication of the player. Referring to FIG. 3D, it is determined (372) whether to authenticate the player. In effect, gaming operations can continue until it is determined (372) to authenticate the player or end (374) the gaming operations. If it is determined (372) to authenticate the player, the player initiates (376) creating and/or tracing an image. This image can, for example, be the same image as the image used to register the player, a similar image, or a completely different image. In any case, one or more attribute values associated with the image are measured (364) in a similar manner as described above.

It should be noted that the player may be provided with an option to retry (378) creating and/or tracing the image if the image is not completed successfully (380). For example, it can be determined (378) whether retrying is an option and/or whether the number of permitted tries has been exceeded. If it is determined (378) not to allow a retry, authentication fails (382). Accordingly, the player can be notified (382) and the authentication method 350 ends. However, if it is determined (378) to allow a retry, the player can effectively recreate and/or retrace the image. If it is determined (380) that the image is complete, one or more attribute values associated with the image are measured (384). These values are compared (386) to those measured and stored (370) when the player initially registered. Accordingly, it is determined (388) whether the difference between the values measured for the authentication (384) and the values initially obtained (370) is within an acceptable range. If it is determined (388) that the difference is within an acceptable range, the player is successfully authenticated (390) and the gaming operations can resume. In effect, the gaming operations can continue until it is determined (372) to authenticate the player or it is determined (374) to end the gaming operations. However, if it is determined (388) that the difference between the attribute values(s) measured (384) when the player is authenticated and those initially measured during the registration process (370) is not within the acceptable range, the player may effectively be given another opportunity to be authenticated (378). If it is determined (378) not to permit another attempt, the authentication fails and the player can be notified accordingly (382) before the authentication method 350 ends. It should be noted that prior to ending the authentication method 350, any attribute value associated with the registration and/or authentication of the player can be deleted. In other words, there is no need to persistently store the measured attribute values and any attribute values can be deleted when method 350 ends. Furthermore, an attribute value need not be associated with an identified player. On the other hand, if desired, attribute values can be stored for a player for future use to allow the player to bypass the registration process. It is also possible to store the measured attribute values in a database for a variety of uses, for example, to adjust the base-line values used to authenticate a player in order to get a more accurate representation of a particular player or group of players and/or customize the acceptable error range for a particular player or group of players. However, it will be appreciated that there is no need to store attribute values for future use. As such, a player can simply register and be authenticated several times during a gaming session without disclosing personal information. After the gaming session is over, data pertaining to the authentication of the player can be removed.

FIG. 4A depicts an authentication process in accordance with one embodiment of the invention. Referring to FIG. 4(a)(1), initially a plurality of images 402, 404, and 406 are displayed for selection by a person (e.g., a number of pictures are displayed for a player of a game). Referring to FIG. 4(a)(2), an image 404 is selected by the person. Referring to FIG. 4(a)(3), the image 404 can be traced using, for example, a stylus 408 on a touch screen 410. Alternatively, referring to FIG. 4(a)(4), the image 404 can be displayed in a portion of a touch screen 410 so that it can be drawn by using the stylus 408. It should be noted that is also possible to display only a portion of an image to be traced. Also, the user may only be required to trace and/or draw a portion of an image. The drawn and/or traced image could have been displayed partially or entirely for the user. In general, an image can be drawn and/or traced. By way of example, during the authentication process, a portion of the image 404 can be displayed and/or used to authenticate a person. Also, it may be required that a partially displayed image be completed by a person who is to be authenticated. Referring back to FIG. 4(a)(4), only a portion 414 of the image 404 which may have been selected during the registration process is displayed for completion by the person to be authenticated. Depending on the level of security, the person may be required to produce an exact, close or similar image as that initially selected (404).

Generally, an image can be drawn or traced for initial determination of one or more attributes that can be subsequently used for authentication. The authentication can be made based on the initial values and those obtained during an authentication process. It will be appreciated that the image used to determine the initial values (or authenticating values) can be different from that used for authentication.

Further, multiple persons can be authenticated individually and/or as a group. By way of example, two individuals may draw and/or trace one or more images in order to be both authenticated to get access to a joint account. The individuals may use the same device or be in remote locations with respect to each other. In any case, it will be appreciated that multiple persons can be jointly and/or individually authenticated virtually at the same time or at different times.

FIG. 4B depicts an authentication process in accordance with another embodiment of the invention. Referring to FIG. 4(b)(1), a person can be prompted to draw an image. In general, this image can be any image. For example, the user can choose an image to draw. Referring to FIG. 4(b)(2), the image 404 is drawn by the user on a touch screen 410. However, in the process of authenticating the user (FIG. 4(b)(3)), the same image 404 or a different image 416 can be used. Referring to FIG. 4(b)(4), an image 416 is drawn for authentication even though a different image, namely, image 404 is used for registration. It will be appreciated that for additional security the image drawn and/or traced can effectively serve as a security code. In other words, the person who is being authenticated could be required to select, enter, draw and/or write a security code.

Figure 4C:
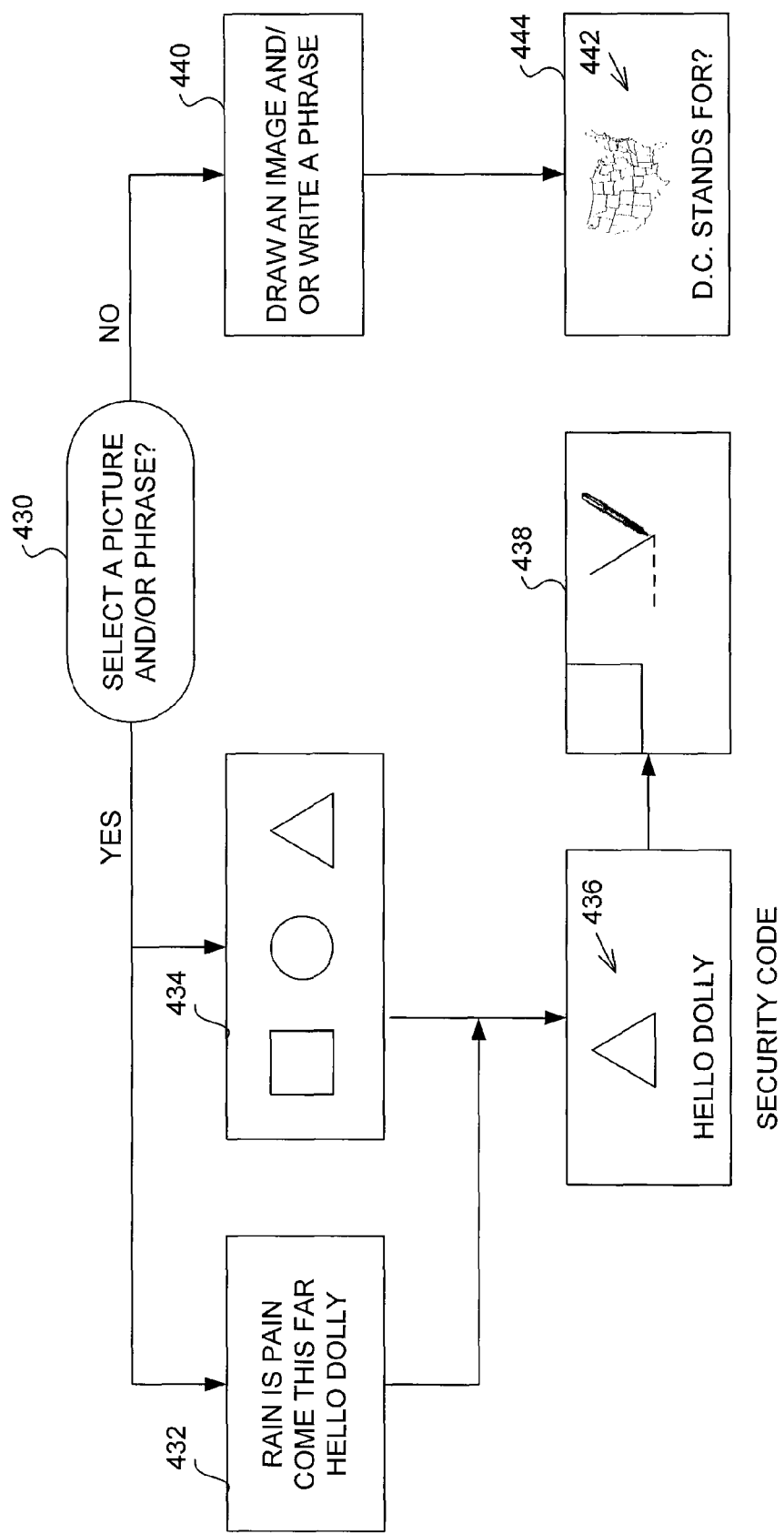
FIG. 4C depicts an authentication process in accordance with another embodiment of the invention.

FIG. 4C depicts an authentication process in accordance with yet another embodiment of the invention. Referring to FIG. 4C, a person can be given the option of selecting a picture and/or phrase as a security code (430). As such, a plurality of pictures (434) and/or phrases (432) can be displayed for selection by the user. A selected picture and/or phrase (436) is then stored as the security code for authenticating the user. Subsequently, the user is requested to draw the selected picture and/or write the selected phrase (436) to be authenticated (438). This allows determining one or more attributes for the picture and the phrase. On the other hand, if the user opts (430) not to select a picture or phrase, the user can be prompted to draw and/or write a phrase. Subsequently, a picture can be drawn and/or a phrase 442 can be written (444) by the user. In any case, an image can be used as the security code for authentication of the user.

Figure 4D:
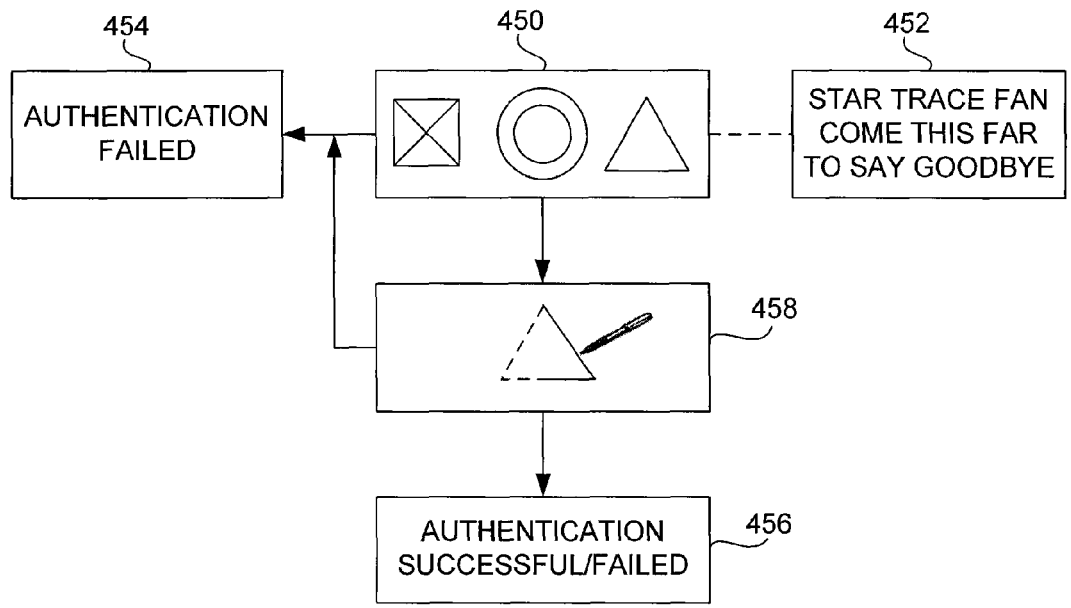
FIG. 4D depicts an authentication process in accordance with one embodiment of the invention.

The security code must be provided by a person being authenticated. FIG. 4D depicts an authentication process in accordance with one embodiment of the invention. Referring to FIG. 4D, during an authentication process, a plurality of pictures (450) and/or phrases (452) are displayed for selection by the user. In order for the user to be authenticated, the selected picture and/or phrase should match the picture and/or phrase that was selected effectively as the security code. As such, if the selected image or phrase does not match the image used as a security code, authentication fails (454). However, if the correct image (i.e., picture, text, a combination of picture and text) is selected, the user can draw and/or trace the correctly selected image (458) for authentication so that one or more attributes associated with the manner the image is created and/or traced can be measured. These attributes can be measured in a similar manner as discussed above. Based on the measured values, authentication can succeed (456) or fail (454).

Figure 4E:
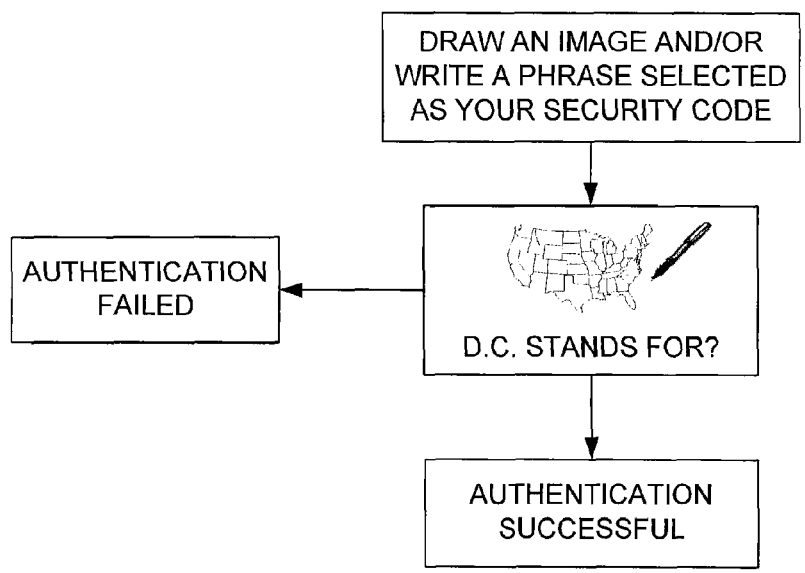
FIG. 4E depicts an authentication process in accordance with yet another embodiment of the invention.

FIG. 4E depicts an authentication process in accordance with yet another embodiment of the invention. Referring to FIG. 4E, a user may be required to draw a picture and/or write a phrase which has been selected as the security code. As such, in order for the authentication to succeed, the user needs to draw the correct image (i.e., the image selected as the security code). In addition, the attributes associated with the image drawn including those associated with the manner the image is created can be considered when it is determined that the image is correct. In other words, in order to authenticate a user, the user must draw the specific image selected as the security code and draw it in a manner that is acceptable for authentication process.

Figure 4F:
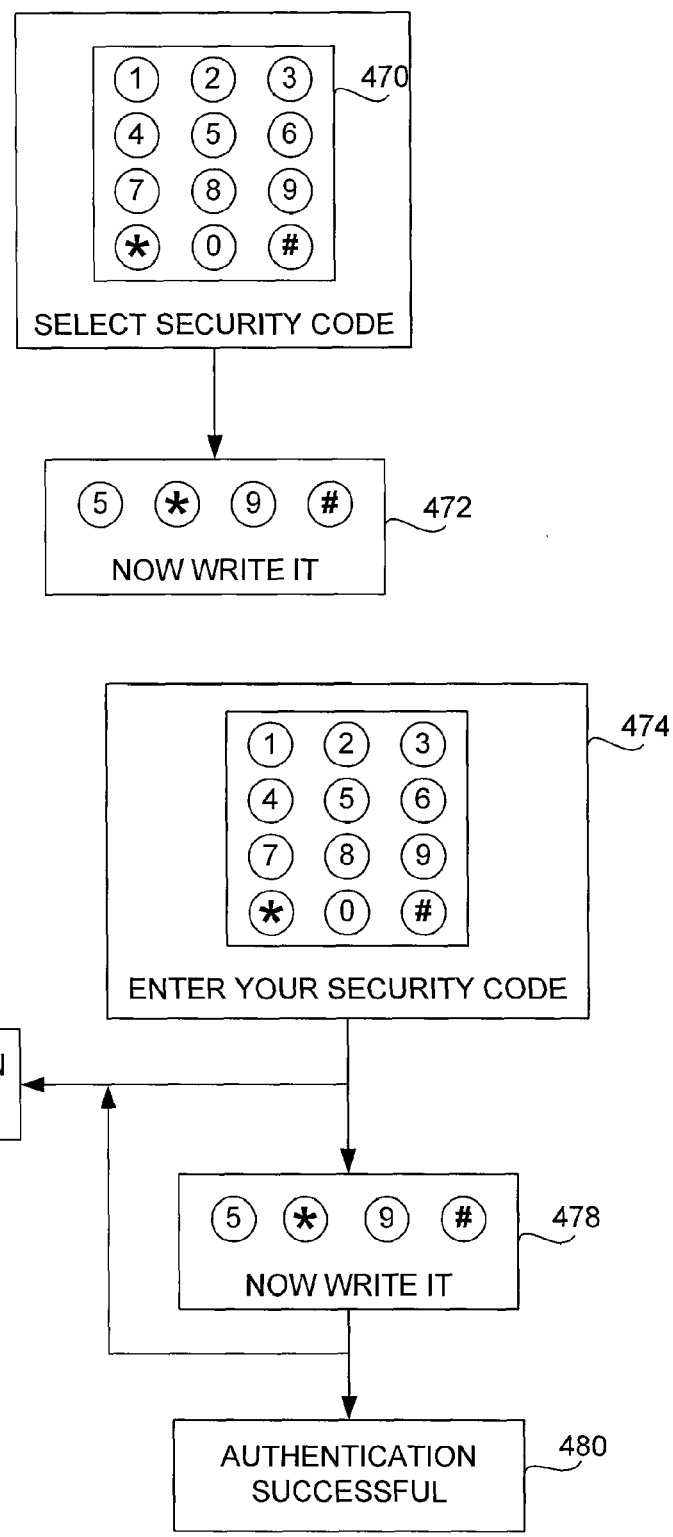
FIG. 4F depicts an authentication process in accordance with still another embodiment of the invention.

FIG. 4F depicts an authentication process in accordance with still another embodiment of the invention. Referring to FIG. 4F, a user can initially select a security code using a touch pad 470. Subsequently, the user can write the selected security code (472) so that one or more attributes associated with the security code can be measured. During an authentication process, the user is requested to enter the security code (474). If the correct security code is not entered, the authentication fails (476). On the other hand, if the correct security code is entered, the user is requested to write the security code (478) so that one or more attributes associated with the security code can be measured and compared to the value(s) initially measured when the user wrote the selected security code (472). If the measured values are acceptable, the user is successfully authenticated (480).

Figure 5A:
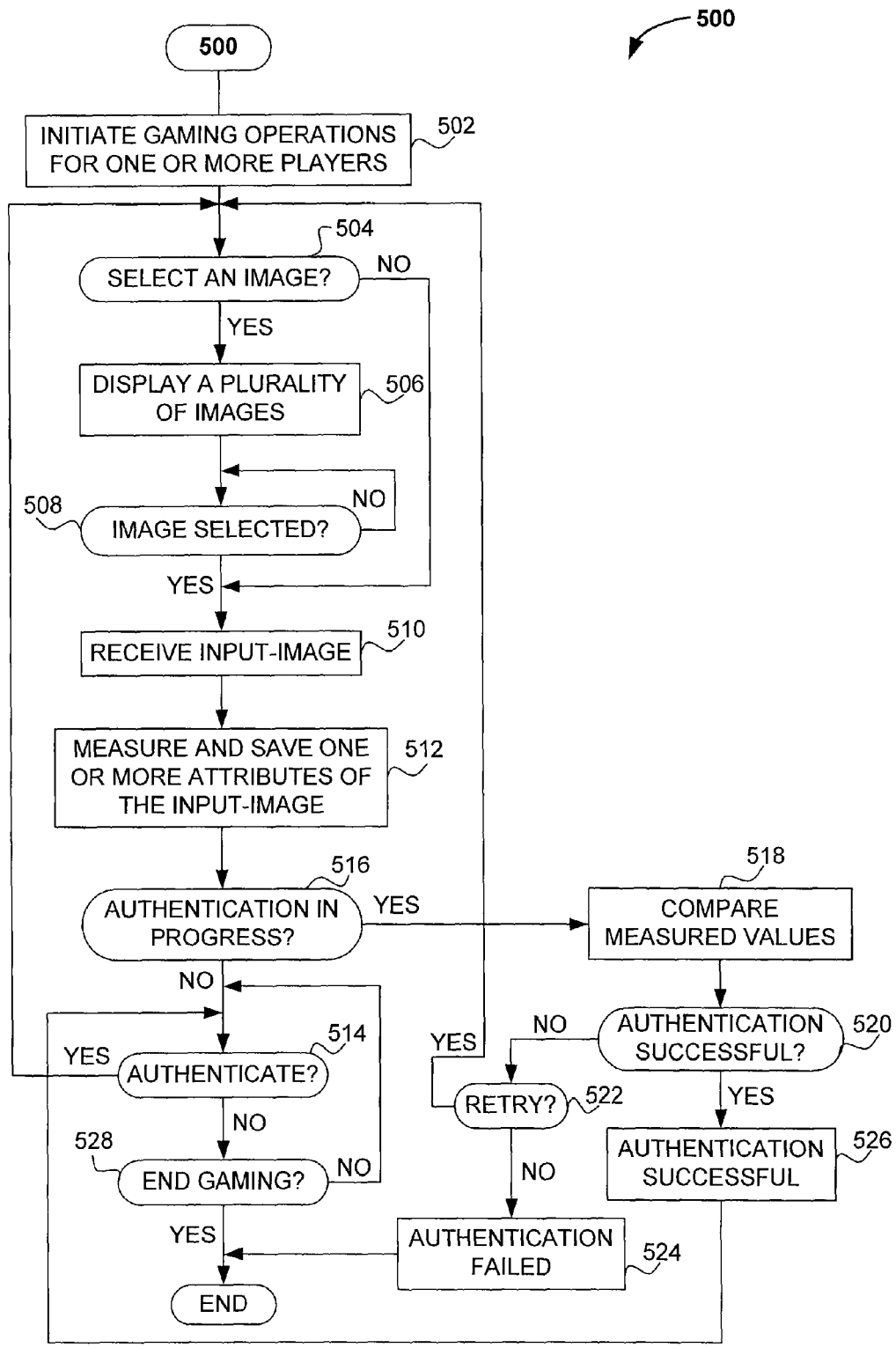
FIG. 5A depicts an authentication method in accordance with yet another embodiment of the invention.

FIG. 5A depicts an authentication method 500 in accordance with yet another embodiment of the invention. Initially, gaming operations are initiated (502) for one or more players. Next, a decision (504) is made as to whether an image (e.g., picture, text, phrase) is to be selected. Those skilled in the art will appreciate that this decision (504) can, for example, represent a design choice and/or can, for example, be provided as an option. If it is determined (504) that an image is to be selected, a plurality of images are displayed (506) for selection by the player(s). Accordingly, an image can be selected (508). After the image is selected (508), an input-image associated with the selected image is received (510). Typically, the input-image represents the selected image as the player creates (e.g., draws) and/or traces the selected image. However, the input-image can be completely different than the selected image. By way of example, a player may select a question and write an answer, or select a picture and draw a different (e.g., complimentary, opposite) picture. If it is determined (502) that an image is not to be selected, the input image is received (510) without displaying any images. In effect, the input image can be provided independently by, for example, a person to be authenticated.

In any case, after the input-image is received (510), one or more attributes of the input-image are measured (512). The attributes can include one or more attributes associated with the manner in which the input-image is provided. Typically, an attribute of the input-image is measured (512) as the input-image is being provided (e.g., attributes are measured as an image is being drawn and/or traced). In any case, the one or more measured attributes are saved (512) and general gaming operations can continue until there is a need to authenticate a player. Referring back to FIG. 5A, when it is determined (514) to authenticate a player, it is determined (504) whether to select an image. In other words, the authentication method 500 can proceed in a similar manner as described above to receive (510) an input-image and measure and save (512) one or more attributes for the input-image. When it is determined (516) that authentication is in progress, the measured value(s) for the input-image are compared (518) to the value(s) initially obtained.

Based on the comparing (518) of the measured values, it is determined (520) whether the authentication is successful. If it is determined (520) that the authentication has failed, it is determined (522) whether to allow another attempt. However, if it is determined (522) not to allow another attempt, authentication fails and the player(s) can be notified (524) before the authentication method 500 ends. On the other hand, if it is determined (520) that the authentication was successful, the player(s) can be notified (526) and general gaming operations can resume until it is determined (514) to authenticate the player(s). The authentication method 500 ends when it is determined (528) to end the gaming operations or authentication fails (524).

Figure 5B:
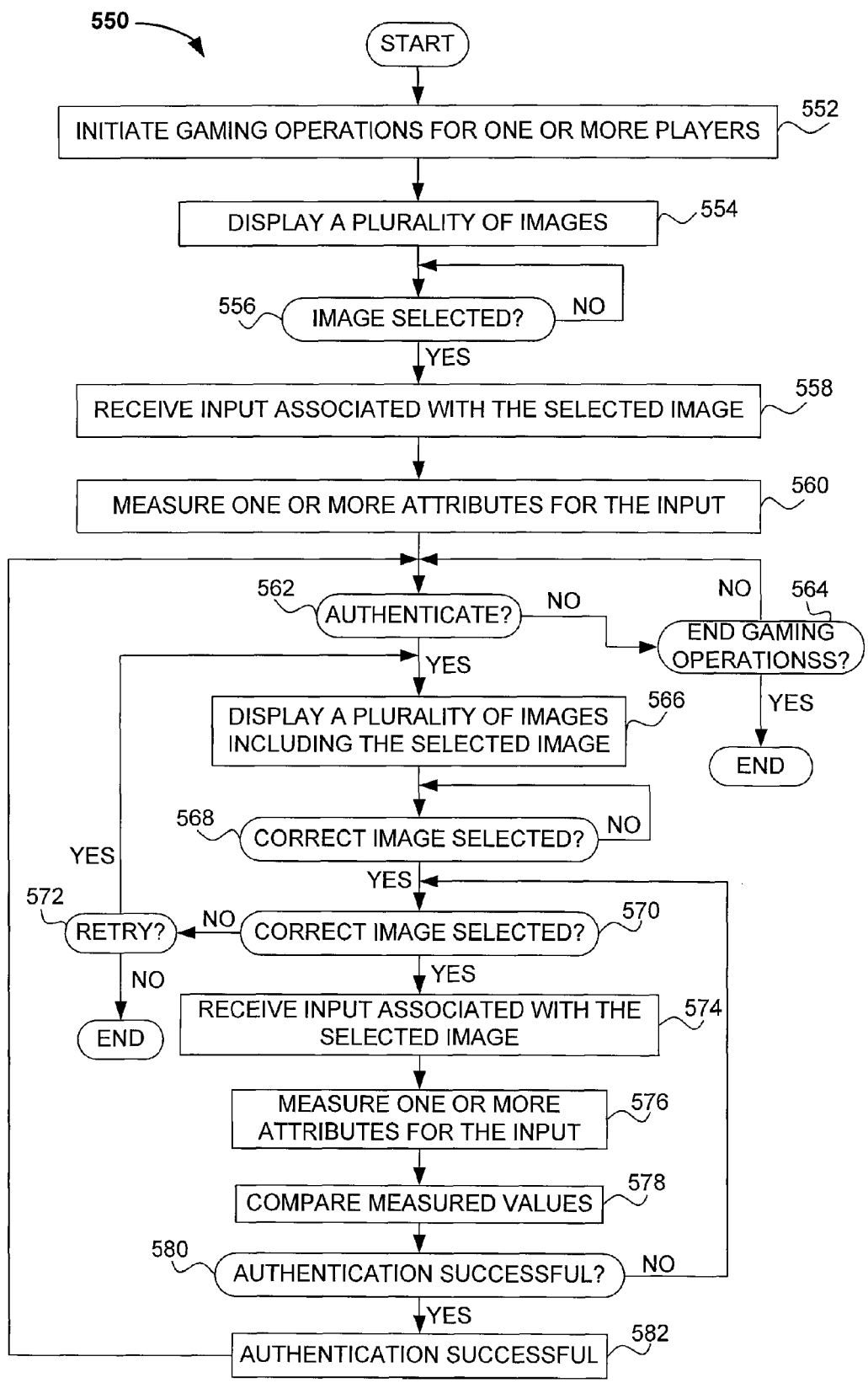
FIG. 5B depicts an authentication method in accordance with yet another embodiment of the invention.

FIG. 5B depicts an authentication method 550 in accordance with yet another embodiment of the invention. Referring to FIG. 5B, initially, gaming operation are initiated (552) for one or more players. Next, a plurality of images are displayed (554) for selection by the one or more players. Subsequently, an image can be selected (556). It will be appreciated that the selected image can effectively serve as a security code. After the image is selected (556), input associated with the selected image is received (558). Thereafter, one or more attributes of the input are measured (560) for subsequent authentication of the one or more players. In effect, general gaming operations can be performed until it is determined (562) to authenticate a player or it is determined (564) to end the gaming operations. If it is determined (562) to authenticate a player, a plurality of images including the selected image is displayed (566). The images are displayed to determine (568) whether the correct image (i.e., the image previously selected as the security code) is selected again. As such, when an image is selected (568), it is determined (572) whether to effectively retry to authenticate the player(s). If it is determined (572) not to allow another attempt for authentication, the authentication method 550 ends. However, if it is determined (572) to allow another attempt, a plurality of images are displayed (566) for selection by the player. If it is determined (570) that the correct image is selected, an input associated with the selected image is received (574) and one or more attributes of the input are measured (576). The measure value(s) of the input is/are compared (578) to the value(s) initially measured (560).

It will be appreciated that based on the comparison (578) of the measured values, it can be determined (580) whether authentication is successful. If it is determined (580) that the authentication is not successful, it is determined (572) whether to allow the player(s) another attempt for authentication. However, if it is determined (580) that authentication is successful, the player(s) are notified (582) that authentication was successful. Subsequently, general gaming operations can resume until it is determined (562) to authenticate a player. The authentication method 550 ends when it is determined (564) to end the gaming operations or authentication effectively fails when another attempt is not allowed (572).

Figure 6A:
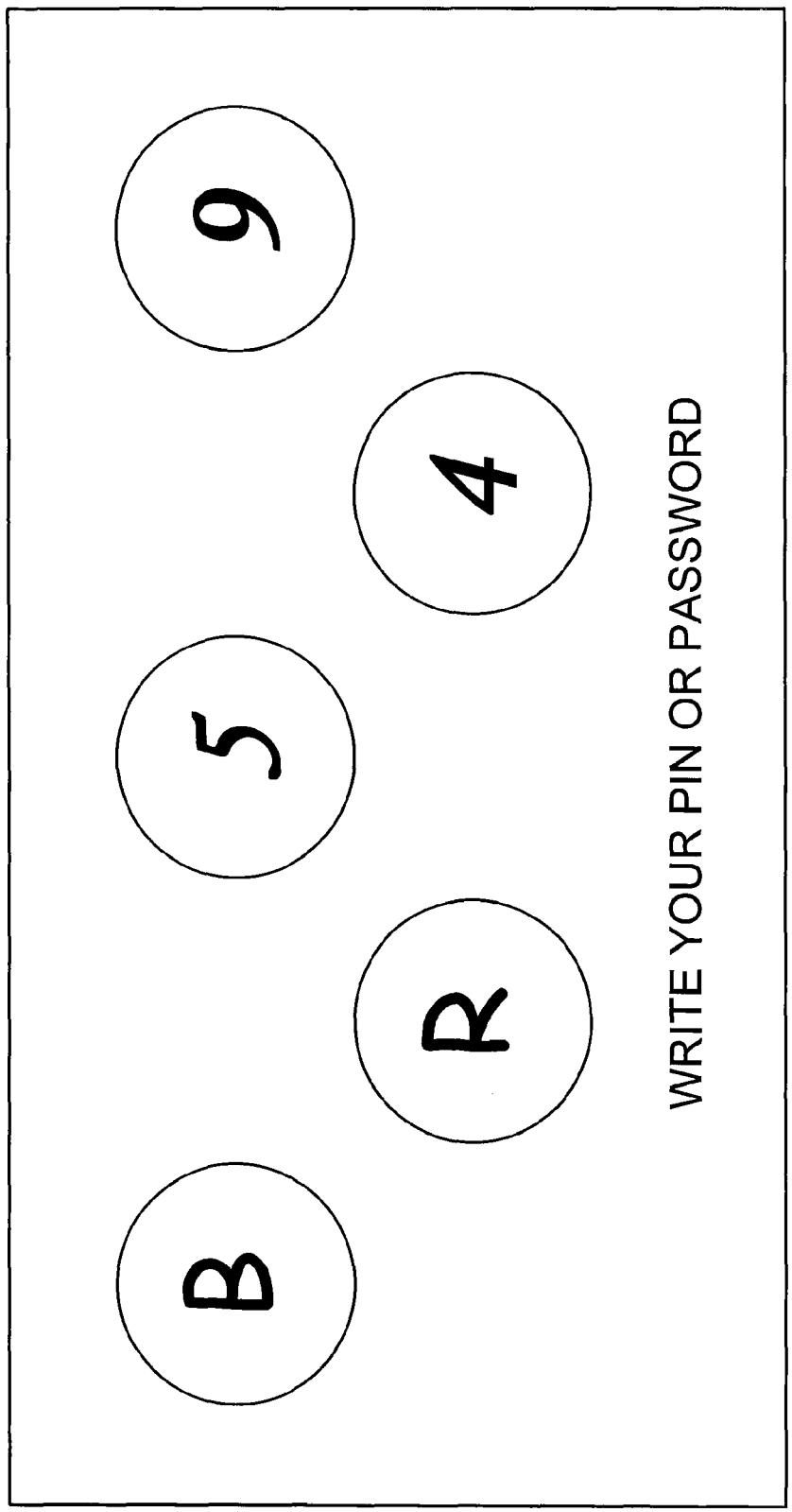
FIG. 6A depicts a screen which can be provided for authentication of a person in accordance with one embodiment of the invention.

FIG. 6A depicts a screen 600 which can be provided for authentication of a person in accordance with one embodiment of the invention. Referring to FIG. 6A, a person can effectively be prompted to write a PIN (or password) which has been assigned as a security code to the player. The person can be authenticated in a similar manner as discussed above by initially determining whether the PIN (or password) entered matches the PIN (or security code). If it is determined that the correct PIN is entered, the user can be further authenticated based on the manner the security code is written.

Figure 6B:
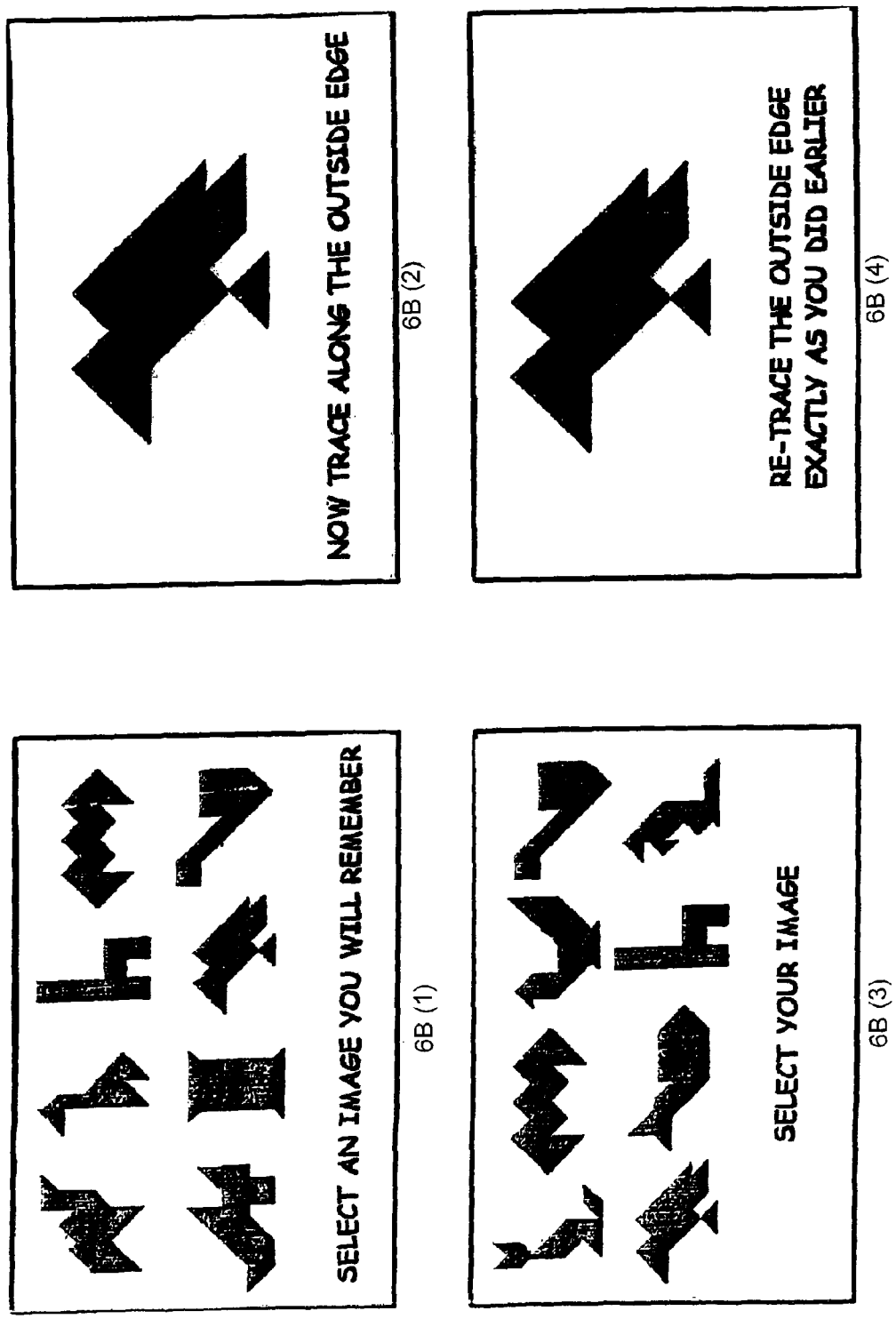
FIG. 6B depicts exemplary images that can be displayed for authentication of a person.

FIG. 6B depicts exemplary images that can be displayed for authentication of a person. Initially, the person can select an image (6B(1)) as a security code. Next, the user is effectively prompted to trace along the outside edge of the selected image so that one or more attributes associated with the manner the image is traced can be measured and stored for subsequent authentication of the user. If the correct image is selected, then it is determined that the user retrace the outside edge of the image as was done earlier 6B(4).

Those skilled will appreciate that the manner in which said at least one image has been created and/or traced can, for example, be one or more of the following: a velocity and/or speed associated with creating and/or tracing said at least one image, an acceleration associated with creating and/or tracing said at least one image, time taken to create and/or trace said at least one image, pressure associated with creating and/or tracing said at least one image, and shape, size, length and/or thickness associated with one or more components of said at least one image. Generally, one or more attribute values for one or more attributes associated with an image and/or input provided in connection with the image can be determined. Examples of various entities that can be associated with a gaming environment include: active players, passive players, administrators and/or supervisors, dealers and/or hosts, and observers.

Figure 7:
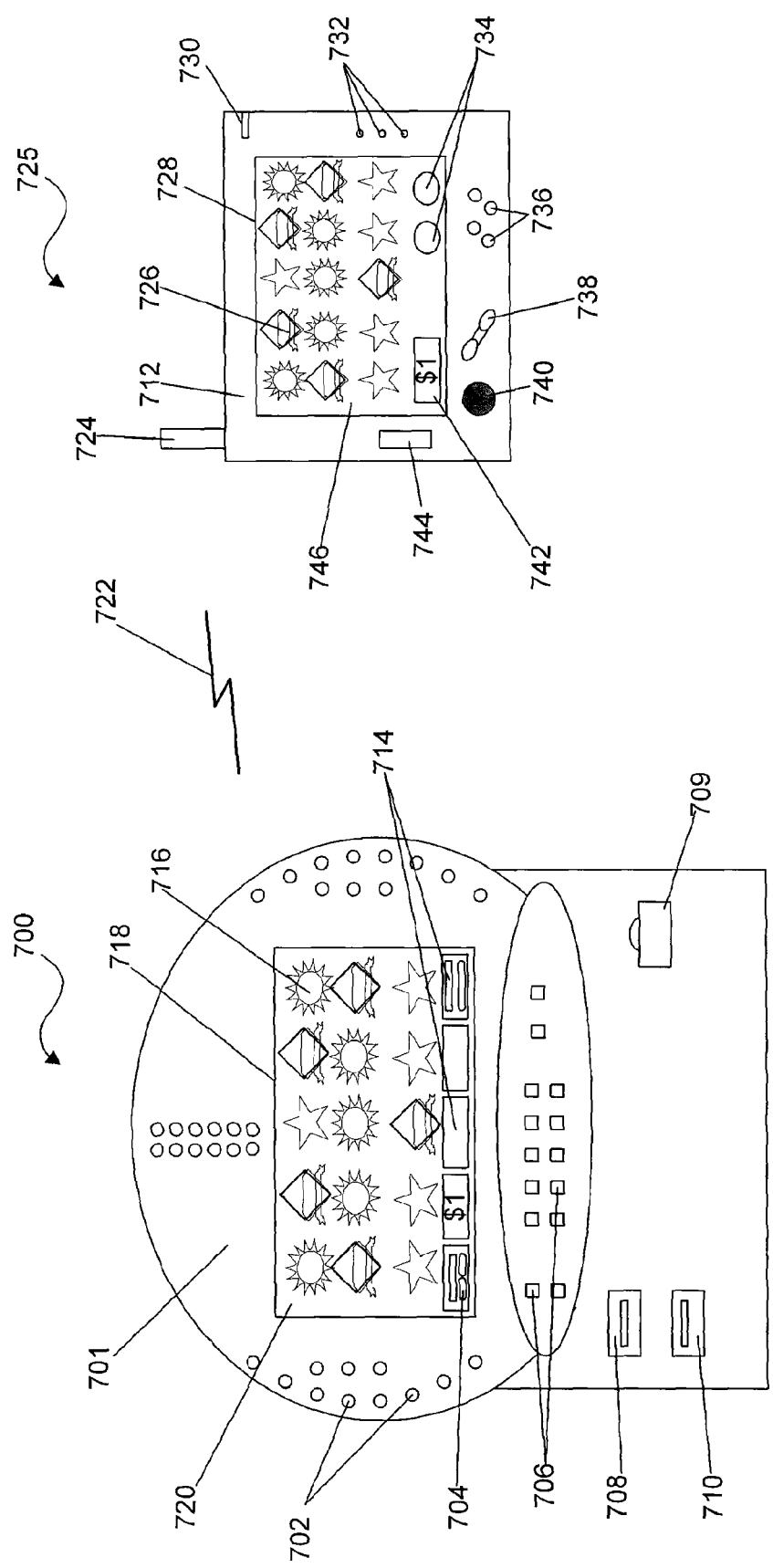
FIG. 7 is block diagram of a gaming machine in communication with a wireless game player.

As noted above, a wireless gaming device can be used to play a game in a gaming environment that uses the authentication techniques of the invention. FIG. 7 is block diagram of a gaming machine 700 in communication with a wireless game player 725. The wireless game player 725 is used as a remote extension to extend the game playing capabilities of gaming machine 700. Game outcomes for games of chance generated using licensed and regulated gaming software executed on the gaming machine 700 may be presented on the wireless game player 725 at remote locations from the gaming machine 700. Thus, a game generated on a gaming machine 700 may be presented on a display 718 located on the main cabinet 701 of the gaming machine and played using input mechanisms located on the main cabinet of the gaming machine. In addition, the game generated on the gaming machine may be presented on a display 728 located on a wireless game player in communication with the gaming machine and played with input mechanisms located on the wireless game player.

As an example, a game 716 may be presented on a display 718 located on gaming machine 700. The game 716 may be played using input mechanisms, such as input buttons 706 or touch screen interface buttons 704. The touch screen interface buttons 704 are activated using a touch screen 720 located over the display 718 of the gaming machine 700. Further, a game 726 may be presented on display 728 located on the wireless game player 725. The game 726 may be played using input mechanisms located on the wireless game player 725, such as 738 and 736 or touch screen interface buttons 734. The touch screen interface buttons 734 are activated using the touch screen 746 located over the display 728.

The game logic for a game presented on display 718 or display 728 is stored within the main cabinet 701 of the gaming machine 700. The game logic, which is typically regulated gaming software, is executed by a master gaming controller located within the main cabinet 701 of the gaming machine 700. A particular game executed by the master gaming controller may be presented on display 718 or, when the wireless game player 725 is activated, on display 728. When the same game is presented on display 718 or on display 728, the graphical presentations of the game may vary between the displays because of hardware differences. For instance, display 718 may by larger than display 728 allowing for higher resolution graphical output on display 718 as compared to display 728.

While playing a game 726 on the portable wireless game player 725, a player may move throughout the areas of a casino where wireless game play is enabled. For instance, a player may be able to play the game 726 with the wireless game player 725 in a restaurant, a keno parlor or a sports book. The player's position does not have to remain static while playing the game 726 on the wireless game player 725 and the player may be actively moving while games are played on the wireless game player 725.

When a game is played on the wireless game player of the present invention, such as 725, all random number generation (RNG) events, game outcomes, meter information, game related information, and all cash transactions are generated and maintained in the licensed (controlled) gaming machine (e.g. 700), and not the wireless game device. Thus, the wireless game player 725 may be considered a remote extension of the gaming machine's 700 display and input mechanisms. With a gaming machine with a remote extension, the gaming machine may operate in both a local mode and a remote mode. In the local operational mode, game play is presented using the display and input mechanisms located on the gaming machine. In the remote operational model, game play is presented using the display and input mechanisms located on the wireless game player. These two operational modes are described as follows.

During local game play on a gaming machine, a player may input money or indicia of credit into the gaming machine, indicate a wager amount, and initiate a game play. For example, to play the slot game 716 on gaming machine 700, a player may deposit money or indicia of credit using the bill validator 708, the card reader 710 or the coin acceptor 709. Status information 714 for the game, such as a game denomination and available credits may be displayed on display 718. Next, using input buttons 706 and touch screen interface buttons 704, the player may make a wager and initiate the game. The gaming machine determines a game outcome and then presents the game outcome to player on the display 718. For instance, after a slot game has been initiated, the video gaming machine calculates the final position of the reels (e.g. the game outcome), the reels on display 718 spin and then stop at pre-determined position. Based on the pre-determined outcome calculated by the master gaming controller, an award may be presented to the player. As another example, after a card game has been initiated, the video gaming machine 700 calculates a sequence of cards to be dealt to the player and card hands are dealt on the display 718. During the card game play, the player may use input mechanisms on the gaming machine 700 to hold or discard cards. After the card game is complete, an award may be presented to the game player.

The games presented on the gaming machine 700 may be enhanced by additional features. Light patterns, such as from lights 702, and sounds may be generated on the gaming machine 700 to enhance the game outcome presentation. In addition, during certain game events, a bonus game may be presented to the game player.

During remote game play on a gaming machine using a wireless game player such as 725, a player may input money or indicia of credit into the gaming machine, activate a wireless game player, indicate a wager amount on the wireless game player and initiate a game play on the wireless game player. For example, to play the slot game 726 on gaming machine 700 using the wireless game player 725, a wireless game play session is requested by the player. A wireless game play session may include one or more game plays on a wireless game player 725 connected to the gaming machine 700 via a wireless communication link 722. The wireless game play session request by the player may be made using an input mechanisms located on the gaming machine.

Prior to beginning, the wireless game play session, a player may be required to deposit money or indicia of credit to in the gaming machine in communication with the wireless game player. The deposited credits may be used during the wireless game play session. For instance, using the bill validator 708, the card reader 710 or the coin acceptor 709 located on the gaming machine 700, the player may provide an initial amount of credits to be used for a wireless game play session using the wireless game player 725. During game play on the wireless game player, a player wagers a certain amount of credits per game. Depending on the outcome of a particular game, the number of credits available for game play may be decreased or may be increased.

After a game player has used all of their credits during a wireless game play session and the player desires to continue the wireless game play session, the player may be required to return to the gaming machine to add additional credits. In other embodiments (See FIG. 9), a card reader or other input device may be attached to the wireless game player 725 and used to add credits to the gaming machine 700. For instance, a player may be able to enter a credit card number or debit card number and transfer funds to the gaming machine to be used as game credits via a touch screen interface on the wireless game player 725. Further, the wireless game player may include a card reader for scanning a magnetic strip on the debit card or credit card.

After establishing game credits on the gaming machine, the wireless game player 725 is activated. In some embodiments, authentication and verification of the user of the wireless game player is performed. For example, to enforce age restrictions imposed by a jurisdiction, the user may be verified and authenticated to use the game player. The wireless game player may have a biometric sensor (not shown) such as a fingerprint sensor. As part of the authentication process, the player may be asked to place their finger on the sensor located on located on the wireless game player. The fingerprint image is sent back to the controller in the machine for comparison. As another example, the wireless game player may include a smart-card reader that reads biometric smart cards (cards having a built-in fingerprint sensor). The smart card has all the personal information of the casino guest. Thus, the authentication could occur directly at the wireless game player. A description of a finger print reader as an identification device is provided in U.S. Pat. No. 6,488,585, which is incorporated herein in its entirety and for all purposes. Other types of verification methods such as a number or a password may be used separately or in combination with biometric identification methods. Other biometric identification methods that may be used with the present invention include but are not limited to feature identification using a camera, retinal pattern identification using a retinal scanner, voice pattern identification input using a microphone and hand-writing recognition using a hand writing input pad.

For security, the wireless game player has an encrypted serial number (code), which is used to verify and authenticate the wireless game player. For additional security, an electronic key may be used with the device. With an electronic key system, the wireless game player device cannot be activated until the key is inserted into a receptacle on the game player. In addition, the wireless game player may have a small GPS (Global Positioning System) device to verify location of the device. Position verification may be used to insure the wireless game player is used only in legal gaming areas of the casino and to track lost or stolen devices. When the gaming machine detects that the wireless game player is in a restricted area, it may discontinue communications with the wireless game player. Further, the wireless game player may have an RF capacitive device built into the wireless game player. RF capacitive devices are often used in retail stores to prevent theft. When the wireless game player is passed through a protected doorway, an alarm may be sounded even when the power is off to the wireless game player. Other security features may be used on the wireless game player and are not limited to electronic keys, GPS sensors or RF capacitive devices described above. Verification and authentication may be required to start every wireless game play session. Further, there may be a non-play time limit. Once this time is exceeded, a verification and authentication cycle or process must be performed. The verification and authentication cycle may be performed for the player and the wireless game player, for only the player or for only the wireless game player. As another example, authentication and verification may be required after a certain number of games played on the gaming device or may be even be required at random intervals. When verification and authentication requirements are not satisfied during a wireless game play session, the game play session will typically be terminated.

In one embodiment, after the wireless game player is activated 725, the input mechanisms, such as the touch screen 720 and the input buttons 706, built into the gaming machine 700 are deactivated and a wireless game play session may begin. The display 718 on the gaming machine 701 may display an "out of order" message, an "operator" message or the display 718 may be blank to indicate the gaming machine is unavailable for game play. During remote game play on the wireless game player 725, gaming information necessary to present the game on the wireless game player, such as a graphical presentation of game outcome and meter information, is generated on the gaming machine 700 are transmitted to the wireless game player via wireless communication 722. The mathematical methods used to generate the game outcomes remain on the gaming machine 700. Further, gaming information required by the gaming machine 700 to the determine the game outcome, such as signals from input mechanisms located on the wireless game player, are transmitted from the wireless game player 725 to the gaming machine 700 via wireless communication 722.

During game play on the wireless game player 725, status information 742 for the game 726, such as a game denomination and available credits may be displayed on display 728. The status information 742 and the game 726 displayed on the wireless game player 725 may appear similar to what is displayed on the gaming machine 701 but is not necessarily identical to what is displayed on the gaming machine 700. Next, using input buttons, such 734, 736 and 738, the player may make a wager and initiate the game. In one embodiment of the present invention, the touch screen interface buttons 734 may be based on a web-browser interface.

After a game has been initiated on the wireless game player 725, via antenna 724, a wireless communication 722 containing the wager and initiate game inputs is sent to the gaming machine 700. In response, to the wager and the initialization of a game, the gaming machine 700 generates a game outcome including an award and possibly a bonus game. Instructions for displaying the game outcome and bonus game are sent in one or more wireless communications 722 to the wireless game player 725. The one or more wireless communications may be a series of information packets. The format of the information packets will vary according to the wireless communication standard used. Details of a wireless network for providing wireless communications is described with respect to FIG. 10. To illustrate the play of a particular game, a slot game and a card game are described. However, the present invention is not limited to these games as nearly any type of game that can be played on a video gaming machine may also be played on the wireless game player 725. When a slot game 726 has been initiated on the wireless game player 725, the gaming machine 700 calculates the final position of the reels (e.g., the game outcome). The gaming machine may send instruction to the wireless game player to spin the reels on display 728 spin and then stop the reels at a pre-determined position. Based on the final position of the reels calculated by the master gaming controller located on gaming machine 700, an award may be presented to the player. In addition, during certain game events, a bonus game may be presented to the game player as part of the slot game. As another example, after a card game has been initiated on the wireless game player 725, the video gaming machine 700 calculates a sequence of cards to be dealt. The gaming machine 700 sends wireless communications 722 to the wireless game player 725 indicating card hands to be dealt on the display 728. During the card game play, the player may use input mechanisms on the wireless game player 725 to hold or discard cards. After the card game is complete, an award may be presented to the game player. A bonus game may also be incorporated into the card game.

When a customer does not wish to use the wireless game player 725 anymore, the customer can terminate the wireless game play session using the touch screen 746 and deactivate the wireless game player 725. As described above, the wireless game player 725 may automatically terminate a wireless game play session and deactivate itself after a period of inactivity. After roaming with the wireless game player 725, the customer may return to the gaming machine providing the wireless game play session and wish to resume play on the main display of the gaming machine. In this case, the customer may depress a "return" button on the wireless game player 725 and after a verification cycle the player can begin playing at the gaming machine again.

The games presented on the wireless game player 725 may be enhanced by additional features. For instance, light patterns and sounds from the audio output 740 may be generated to enhance the game outcome presentation and add excitement to the games played on the wireless game player 725. Further, the wireless game player may include an audio output interface for connecting headphones. As part of a game outcome presentation, sounds may be transmitted through the audio output interface to headphones worn by the game player.

Details of the wireless game player hardware are now described. The wireless game player 725 is generally a hand-held device. It consists of a housing 712, display 728, touch screen 746, switch panel 744, battery, wireless communication interface, and controller. In one embodiment of the present invention, a modified DT Research WebDT pad (DT Research, Inc., Milpitas, Calif.) is used as a wireless game player. However, the present invention is not limited to the DT research WebDT pad as other hand-held wireless devices such as personal digital assistants (PDA) may also be used.

In one embodiment, the wireless game player may be approximately 10.5×9.5×1.0 inches in size, weigh 3 pounds and use a 10.4 inch color LCD touch screen display. Typically, an 8 inch to 10.4 inch display provides a sufficient viewing area without reducing the size of the character fonts to a point where they are unreadable by most players. The touch screen (sensor) 746 is overlaid on the displayable surface of the LCD 728. Other display technologies can be used instead of LCD, plus some display technologies will incorporate a built-in touch screen (internal vs. external). To activate the touch screen 746, a stylus 730 may be used, but most people will use their fingers.

Audio is available via the small built-in speaker 740 or an external headset. Lighting schemes, such as arrays of LEDs, may be added to the wireless game player 725 to provide visual effects and to communicate status information to a game player. Status information, such as a battery level and connection status, may be provided by the status lights 732. The layout and number of the input buttons, including 738 and 736, is variable. In FIG. 7, the configuration of the input buttons on the gaming machine 700 and wireless game player are different. In one embodiment of the present invention, the input buttons on the wireless game player 725 may be configured in a manner similar to input buttons located on the gaming machine. Further, other devices on the wireless game player, such as the audio output 740, the status lights 732, the antenna 724 and the on/off switch 744 may be located at other locations on the housing 712 depending on the design of the wireless game player.

In one embodiment, the battery will last 5 hours between charging. Charging of the wireless game player may be accomplished by setting the wireless game player in a special storage cradle. The cradles may be in the form of storage bins located in a special area, located at the gaming machine or built as holders located on a desk, counter or table. For instance, a storage cradle for charging the wireless game player may be located in a keno parlor, restaurant tables or sports book. When the wireless game player is placed in a storage cradle it may used while being charged.

The wireless game player 725 can, for example, use an IEEE 802.11b compliant wireless interface. It is a 2.4 Ghz Direct Sequence Spread Spectrum radio system. It has a range of up to 330 ft (inside) from any access point. The data rate is 11 Mbps. IEEE 802.11b is a commonly used radio standard. Other exemplary wireless standards that may be used include IEEE 802.11a, IEEE 802.11x, hyperlan/2, Bluetooth, IrDA, and HomeRF.

In the example above, local gaming and remote gaming on gaming machine 700 has been described in a mutually exclusive manner. Therefore, when local gaming is enabled, remote gaming is disabled and when remote gaming is enabled, local gaming is disabled. However, the present invention is not so limited. Gaming machines that support only remote gaming and not local gaming may be used with the present invention. These gaming machines (see FIG. 10) may be located away from the casino floor. Further, a gaming machine may support simultaneously a plurality of remote gaming devices for game play and not just a single remote gaming device. Finally, gaming machine may be used that simultaneously provide both remote game play and local game play. For instance, one game player may use a gaming machine for local play while another game player is using a wireless game player connected to the gaming machine to play remotely.

Figure 8:
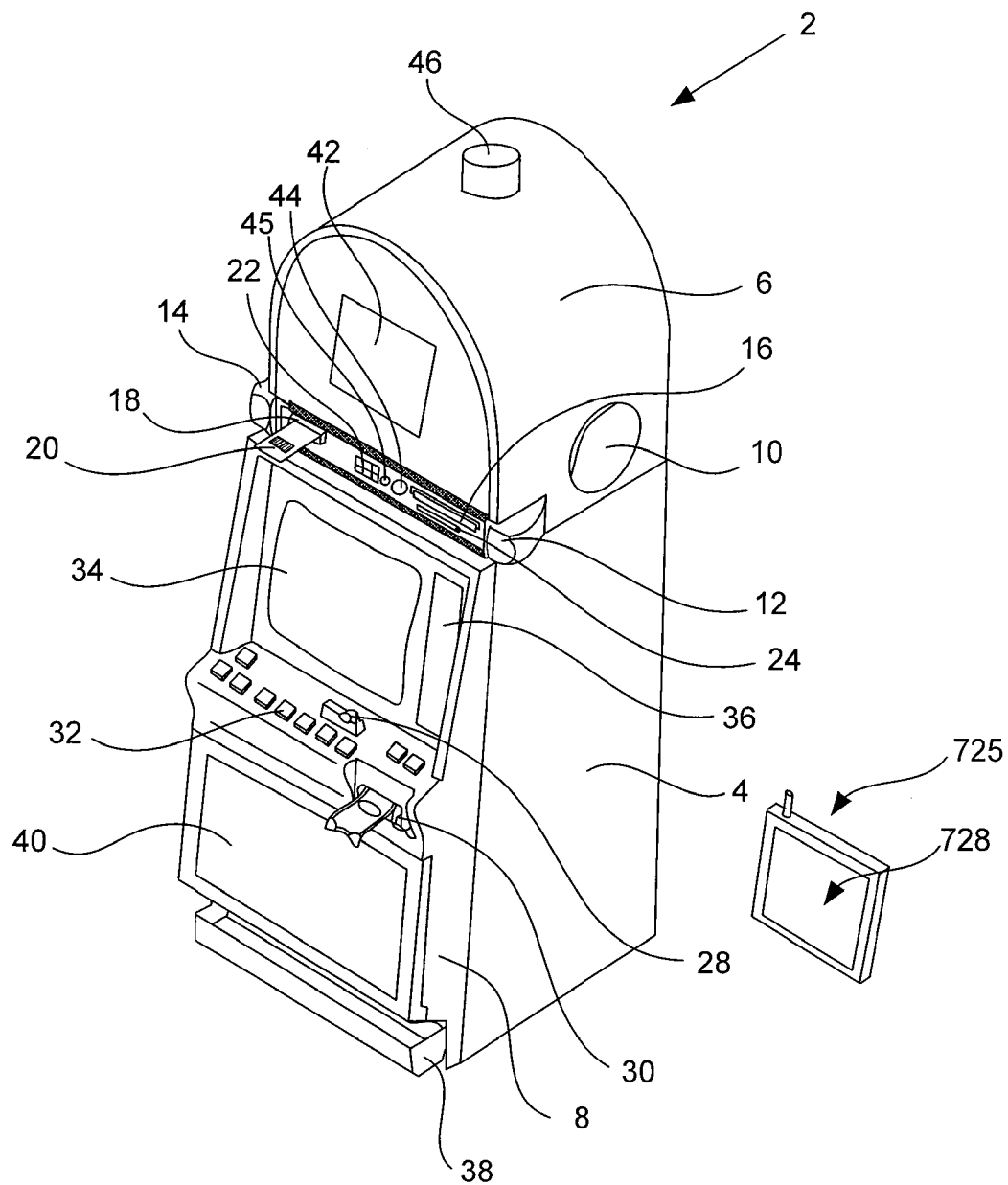
FIG. 8 is a perspective drawing of a gaming machine having a top box and other devices

In FIG. 8, another video gaming machine 2 suitable for use with the present invention is shown. Referring to FIG. 8, more details of a gaming machine as well as additional gaming services that may be provided with a gaming machine providing remote game play sessions are described. For instance, player tracking services may be provided on gaming machines of the present invention and player tracking points may be accumulated during a wireless game play session. Further, using a player tracking device located on a gaming machine, a player may be able to request a wireless game player for use in a wireless game play session.

Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The main display monitor 34 will typically be a cathode ray tube, high resolution flat-panel LCD, or other conventional electronically controlled video monitor. The gaming machine 2 includes a top box 6, which sits on top of the main cabinet 4. A second display monitor 42 may be provided in the top box. The second display monitor may also be a cathode ray tube, high resolution flat-panel LCD or other conventional electronically controlled video monitor. In addition, the gaming machine 2 is designed to communicate to the wireless game player 725 with display 728. The wireless game player 725 effectively provides a remote extension to gaming machine 2.

Figure 9:
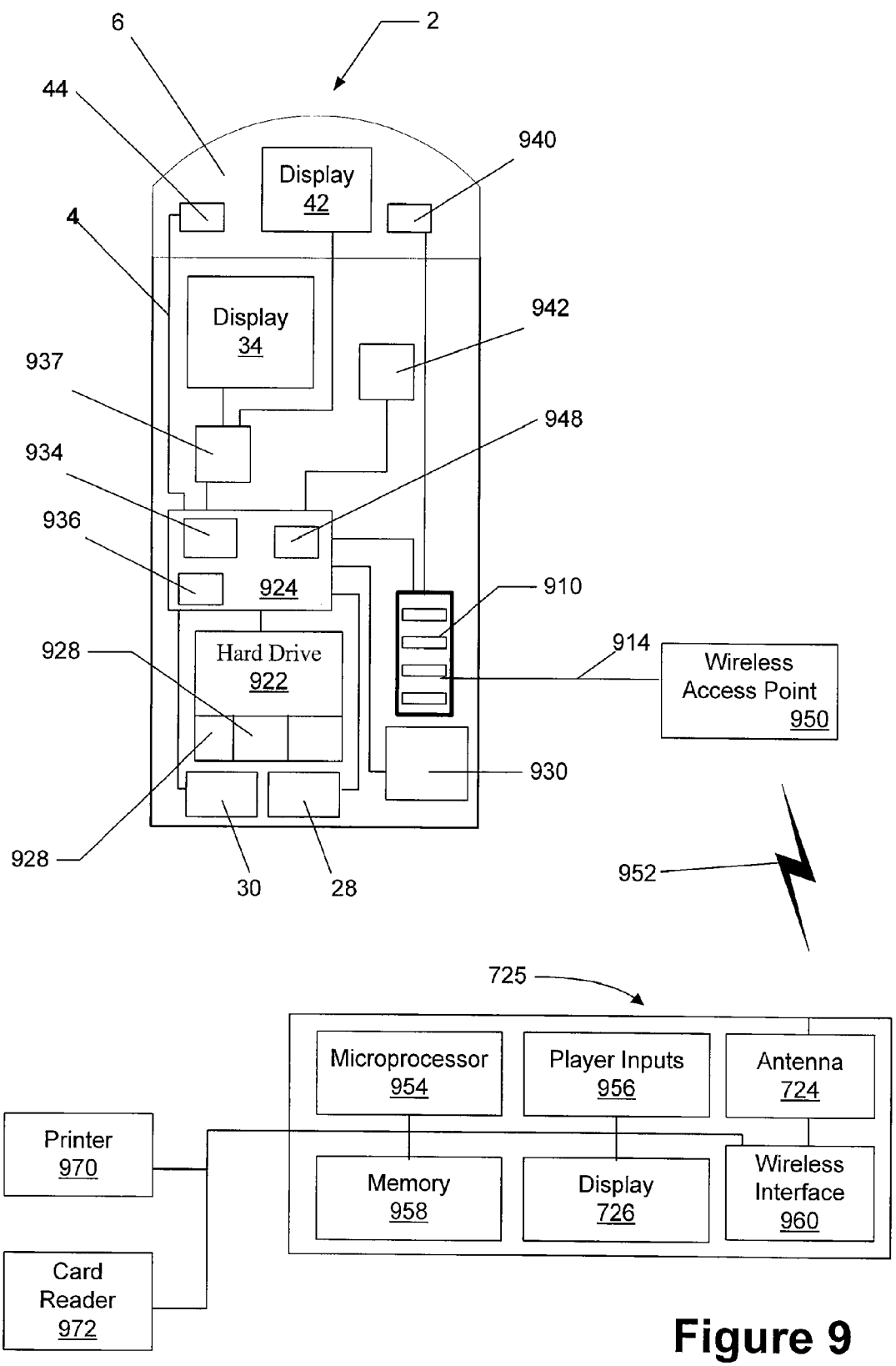
FIG. 9 is a block diagram of the internal components of a gaming machine and internal components of a wireless game player.

Typically, after a player has initiated a game on the gaming machine, one purpose of the main display monitor 34, the second display monitor 42 or the remote display 728 is the visual display of a game outcome presentation, including bonus games, controlled by a master gaming controller 924 (FIG. 9). Also, the main display monitor 34, the second display monitor 42 and the remote display 728 may also be utilized to display entertainment content independent of the game outcome presentation. For example, broadcast events, including television programming, may be provided to the main display monitor 34, the secondary display monitor 42 or the remote display 728. The broadcasts events may be sent to the gaming machine 2 via a cable link or other suitable link from outside of the gaming machine. All or some subset of the programming provided by a television broadcaster may be displayed as entertainment content on one or more of the video displays.

Television programming content of particular interest to casino operators and game players may include, for example, sporting events, talk shows, game shows, soap operas, advertisements, situation comedies, etc. In addition, broadcasts of competitive events on which the player can wager may be displayed. For example, dog racing or horse racing events may be displayed as content on the remote display 728. In such events, typically, there is a rather long down time between races. During this period, the player may play the wireless game player 725 connected to the gaming machine. Also, the television programming entertainment content may be displayed while a player is engaged in playing a game on the wireless game player 725 or between games. Similarly, the entertainment content may include information available on the Internet, including the World Wide Web, for more technologically sophisticated players.

Returning to the gaming machine in FIG. 8, the information panel 36 may be a back-lit, silk screened glass panel with lettering to indicate general game information including, for example, the number of coins played. The bill validator 30, player-input switches 32, video display monitor 34, and information panel are devices used to play a game on the game machine 2 including the wireless game player 725. The devices are controlled by a master gaming controller (see FIG. 9), housed inside the main cabinet 4 of the machine 2. Many possible games, including traditional mechanical slot games, video slot games, video poker, video pachinko, multiple hand poker games, video pai-gow poker, video black jack, video keno, video bingo, video roulette, video craps, video card games and general games of chance, may be provided with gaming machines of this invention. These games may be played using the wireless game player 725.

General games of chance refer to games where a player makes a wager on an outcome of the game. The outcome of the game of chance may be affected by one or more decisions may be the player. For instance, in a video card game, the player may hold or discard cards which affects the outcome of the game.

The top box 6 houses a number of devices, which may be used to add features to a game being played on the gaming machine 2, including speakers 10, 12, 14, a ticket printer 18 which may print bar-coded tickets 20, a key pad 22, a florescent display 16, a camera 45, microphone 44 and a card reader 24 for entering a magnetic striped cards. The speakers may be used to project sound effects as part of a game outcome presentation. The keypad 22, the florescent display 16 and the card reader 24 may be used for to enter and display player tracking information. As another example, the player may enter playing tracking information and identification information using the card reader 24 and the main video display 34 where the main video display may be used as a touch screen to enter information. Player tracking information may be entered into the gaming machine before a player initiates a game on the gaming machine. Typically, the player's incentive to enter player tracking information into the gaming machine 2 is potential rewards related to the amount of a player's game play.

The top box also includes a candle 46. The candle is a light that may be activated by the master gaming controller on the gaming machine. In one embodiment, an antenna (not shown) may be installed in the candle. The antenna may be used to provide wireless game play sessions to one or more wireless game players in communication with the gaming machine 2 via the antenna.

In addition to enabling player tracking services, the key pad 22, the florescent display 16 and the card reader 24 may be used to enter identification information that enables a player to access entertainment content or receive personal messages on the gaming machine independent of a game play and game outcome presentation on the gaming machine 2. For example, a player may enter a personal identification number into the gaming machine 2 using the key pad 22 that allows the player to receive entertainment content such as viewing a movie or a broadcast event. As another example, after entering the personal identification number, the player may be allowed to receive a personal message indicating a table is ready at a restaurant in the casino or to receive a personal message containing information on a sporting event such as a score of personal interest to the player utilizing the gaming machine.

In one embodiment of the present invention, the player tracking services and related gaming service described above may be provided via a touch screen interface on the wireless game player 725. For instance, the wireless game player 725 may include a card reader for reading a player tracking card and player tracking identification information may be provided via a touch screen interface on the wireless game player. Further, the player may be able to access player tracking information using the wireless game player 725.

In addition to the devices described above, the top box 6 may contain different or additional devices than shown in the FIG. 8. For example, the top box may contain a bonus wheel or a back-lit silk screened panel which may be used to add bonus features to the game being played on the gaming machine. During a game, these devices are controlled and powered, in part, by circuitry (not shown) housed within the main cabinet 4 of the machine 2. Understand that gaming machine 2 is but one example from a wide range of gaming machine designs on which the present invention may be implemented. For example, not all suitable gaming machines have top boxes or player tracking features. Further, some gaming machines have two or more game displays—mechanical and/or video, while others are designed for bar tables and have displays that face upwards. As another example, a game may be generated in on a host computer and may be displayed on a remote terminal or a remote computer. The remote computer may be connected to the host computer via a network of some type such as the Internet. Those of skill in the art will understand that the present invention, as described below, can be deployed on most any gaming machine now available or hereafter developed.

Returning to the example of FIG. 8, when a user selects a gaming machine 2, he or she inserts cash through the coin acceptor 28 or bill validator 30. Additionally, the bill validator may accept a printed ticket voucher which may be accepted by the bill validator 30 as an indicia of credit. Once cash has been accepted by the gaming machine, it may be used to play a game on the gaming machine. Typically, the player may use all or part of the cash entered into the gaming machine to make a wager on a game play. Depending on the amount of the wager on a game or for a fee, a player may be able to access various entertainment content sources for a length of time. For example, a wager on a game above a certain threshold amount may enable a player to watch a broadcast event or to access the World Wide Web for up to 5 minutes after each wager on the gaming machine 2. In addition, cash or indicia of credit entered into the gaming machine may be used to purchase entertainment content independent of a wager made on a game on the gaming machine. For example, for a 10 dollar fee, a player may view a movie on the gaming machine. While watching the movie on the gaming machine, the player may play games on the gaming machine 2 or the wireless game player 725 or just watch the movie.

During the course of a game, a player may be required to make a number of decisions which affect the outcome of the game. For example, a player may vary his or her wager, select a prize, or make game-time decisions which affect the game play. These choices may be selected using the player-input switches 32, the main video display screen 34 or using some other device which enables a player to input information into the gaming machine including a key pad, a touch screen, a mouse, a joy stick, a microphone and a track ball.

When a game is not being played on the gaming machine or during particular game operational modes, the player may select an entertainment content source using the above mentioned inputs where the entertainment content is independent of a game being played on the gaming machine. The entertainment content source may include, for instance, a CD player, an FM/AM tuner, a VHS player, a DVD player, a TV tuner, a musical jukebox, a video jukebox, a computer, a server and a media software application. It will be appreciated, however, that any information source may be utilized. Entertainment content from these sources may be selected and displayed on the wireless game player 725. For instance, a player may listen to music from the FM/AM tuner via headphones connected to the wireless game player.

Before playing a game, a player may select the video jukebox, which may contain a DVD player loaded with many DVDs, as the entertainment content source and preview a movie on at least one of the display screens on the gaming machine 2. The DVDs may be stored on the gaming machine 2 or in a central location separate from the gaming machine. The visual display of the output from the video jukebox may be viewed by the player on the main video display screen 34, the secondary video display screen 42 or the remote display 728. The sound for the movie may be projected by the speakers 10, 12 and 14 on the gaming machine or a player may listen to the movie through headphones. As described above, the wireless game player 725 may include an interface for audio output such as a headphone jack.

The game player may also use the player input switches 32, keypad 22, and other input devices to control a feature of the entertainment content. For example, when the entertainment content is a movie, the player input switches 32 and keypad may be operated to fast forward, stop or pause the movie. When the entertainment content is accessing the World Wide Web through a web-browser, the player input switches 32 and keypad may be used to operate the web-browser. Input switches, as described with respect to FIG. 7, on the wireless game player 725 may also be used to control these functions.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, throbbing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. When a player is using the wireless game player 725, credits available during the wireless game play session are stored on the gaming machine. To redeem credits, for instance to receive a printed ticket voucher, the player may have to return to the gaming machine 700 or a printing station supporting communications with the wireless game player 725. In some embodiments of the present invention, a player may be able to electronically transfer credits to a remote account accessible by the player.

FIG. 9 is a block diagram of the internal components of a gaming machine 2 and a wireless game player 725. Components that appear in FIGS. 7 and 8 are identified by common reference numerals. A master gaming controller 924 controls the operation of the various gaming devices and the game presentation on the gaming machine 2. In the present invention, the wireless game player 725 is one of the gaming devices the master gaming controller 924 controls.

The master gaming controller 924 may communicate with the wireless game player 725 via a wireless communication link 952. The wireless communication link may use a wireless communication standard such as but not limited to IEEE 802.11a, IEEE 802.11b, IEEE 802.11x (e.g. another IEEE 802.11 standard such as 802.11c or 802.11e), hyperlan/2, Bluetooth, and HomeRF.

As described above, in the present invention, the gaming machine may operate in a local operational mode where a game is presented on a local display screen, such as 32 or 42, a remote operational mode where a game is presented on the wireless game player 725 or combinations thereof. When the gaming machine 2 is in a local operational mode, using a game code and graphic libraries stored on the gaming machine 2, the master gaming controller 924 generates a game presentation which is presented on the displays 34 and 42. The game presentation is typically a sequence of frames updated at a rate of 60 Hz (60 frames/sec). For instance, for a video slot game, the game presentation may include a sequence of frames of slot reels with a number of symbols in different positions. When the sequence of frames is presented, the slot reels appear to be spinning to a player playing a game on the gaming machine. The final game presentation frames in the sequence of the game presentation frames are the final position of the reels. Based upon the final position of the reels on the video display 34, a player is able to visually determine the outcome of the game.

Each frame in sequence of frames in a game presentation is temporarily stored in a video memory 936 located on the master gaming controller 924 or alternatively on the video controller 937. The gaming machine 2 may also include a video card (not shown) with a separate memory and processor for performing graphic functions on the gaming machine. Typically, the video memory 936 includes 1 or more frame buffers that store frame data that is sent by the video controller 937 to the display 34 or the display 42. The frame buffer is in video memory directly addressable by the video controller. The video memory and video controller may be incorporated into a video card which is connected to the processor board containing the master gaming controller 924. The frame buffer may consist of RAM, VRAM, SRAM, SDRAM, etc.

The frame data stored in the frame buffer provides pixel data (image data) specifying the pixels displayed on the display screen. In one embodiment, the video memory includes 3 frame buffers. The master gaming controller 924, according to the game code, may generate each frame in one of the frame buffers by updating the graphical components of the previous frame stored in the buffer. Thus, when only a minor change is made to the frame compared to a previous frame, only the portion of the frame that has changed from the previous frame stored in the frame buffer is updated. For example, in one position of the screen, a 2 of hearts may be substituted for a king of spades. This minimizes the amount of data that must be transferred for any given frame. The graphical component updates to one frame in the sequence of frames (e.g. a fresh card drawn in a video poker game) in the game presentation may be performed using various graphic libraries stored on the gaming machine. This approach is typically employed for the rendering of 2-D graphics. For 3-D graphics, the entire screen is typically regenerated for each frame.

Pre-recorded frames stored on the gaming machine may be displayed using video "streaming". In video streaming, a sequence of pre-recorded frames stored on the gaming machine is streamed through frame buffer on the video controller 937 to one or more of the displays. For instance, a frame corresponding to a movie stored on the game partition 928 of the hard drive 922, on a CD-ROM or some other storage device may streamed to the displays 34 and 42 as part of game presentation. Thus, the game presentation may include frames graphically rendered in real-time using the graphics libraries stored on the gaming machine as well as pre-rendered frames stored on the gaming machine 2.

When the gaming machine is in a remote operational mode and a game is presented on a display 726 of the mobile wireless game player 725, video frame data may be directly streamed from gaming machine 2 via the wireless interface 948 and wireless access point 950 to the wireless game player 725 via wireless interface 960. The video frame data may be stored in a memory 958 on the wireless game player 958 and then displayed on the display 725. The video frames sent to the wireless game player may be reduced in resolution and compressed to reduce the communication bandwith necessary to transmit the video frames to the wireless game player 725.

In another embodiment, the video frames to present a game of chance may be rendered locally on the wireless game player 725. Graphical programs that allow a game to be rendered on the wireless game player may be stored in memory 958. For instance, the memory 958 may store a graphical program to render a slot game or a graphical program to render a card game. The memory 958 may store graphical programs for one or more games. For instance, the memory 958 may store graphical routines for a plurality of games supported by gaming machine 2. In one embodiment, the wireless game player 725 may be configured to allow different graphical programs for presenting different games to be downloaded into memory 958.

In other embodiments, the wireless gaming device may include a detachable memory and interface for the detachable memory. The detachable memory may store graphical applications for one or more games. Thus, to enable a particular game, a detachable memory storing graphical applications for the particular game may be inserted in the detachable memory interface on the wireless game player 725. The detachable memory may be in the form of read-only cartridges and may include a locking mechanism that prevents removal of the cartridge by the player. Thus, only authorized gaming personnel may be able to change a cartridge in the wireless game player.

The wireless game player may include a video card (not shown) to aid in the rendering process. The video card may include one or more graphical processing units that are used to render images to the display 726. The video card may be used to render 2-D graphics and 3-D graphics on the wireless game player 725. Graphical processing may also be performed by microprocessor 954 including 2-D and 3-D graphical rendering. Some images may be pre-rendered and stored on the wireless game player 725 and activated by a small string of commands from the gaming machine 2. Animations, such as reel rotation for a slot game, may be performed by routines on the wireless game player 725.

When the game graphics are rendered locally on the wireless game player 725, all of the game logic necessary to present the game of chance still resides on the gaming machine 2. Any switch or touch input necessary for game play on the wireless game player 725 (e.g., making a wager, initiating a game, holding cards, drawing cards, etc.) is transmitted 2 from the wireless game player 725 to the gaming machine 2. The gaming machine 2 executes gaming logic associated with the switch or touch inputs and sends the result back to the wireless game player 725. The wireless game player 725 verifies information sent from the gaming machine. In general, communication between the gaming machine 2 and the wireless game player 725 is encrypted. For any screen image or input involving the outcome of the game or betting, an additional level of transmit and receive data verification may be used by the wireless game player 725 and the gaming machine 2 to ensure the correct information is displayed on the wireless game player 725.

For illustrative purposes only, a series of commands between the gaming machine 2 and the wireless game player is described. The present invention is not limited to the commands described in this example. In response to input from player inputs 956 located on the wireless game player 725, the master gaming controller 924 may send a series of instructions to the wireless game player 725 that allow the game of chance to be rendered on display 726 of the wireless game player 725. The master gaming controller may also send instructions controlling audio output and other gaming devices on the wireless game player 725. For instance, for a slot game, the master gaming controller 924 may calculate symbol position, reel position, start and stop rotation for a number of reels. Then, the master gaming controller 925 may send one or more messages via the wireless communication link 952 to the wireless game player 725 with instructions such as 1) "render reels spinning", 2) "render reel 1 at position A", 3) "render reel 2 at position B", 4) "render reel 3 at position C", 5) "output audio B", 6) "display light pattern A," etc. The instructions may be processed and implemented by the microprocessor 954 using graphical software stored on the wireless game player 725.

In one embodiment, the wireless game player may be connected to a number of peripheral devices such as a printer 970 or a card reader 972. The printer 970 and the card reader 972 may communication with the wireless game player via a wire communication protocol such as serial, parallel, USB, Firewire or IEEE 1394. The peripheral devices, such as 970 and 972, may be controlled by the microprocessor 954 according to inputs received by the wireless game player and may also be controlled by the master gaming controller 924 on the gaming machine 2.

For gaming machines, an important function is the ability to store and re-display historical game play information. The game history provided by the game history information assists in settling disputes concerning the results of game play. A dispute may occur, for instance, when a player believes an award for a game outcome was not properly credited to him by the gaming machine. The dispute may arise for a number of reasons including a malfunction of the gaming machine, a power outage causing the gaming machine to reinitialize itself and a misinterpretation of the game outcome by the player. In the case of a dispute, an attendant typically arrives at the gaming machine and places the gaming machine in a game history mode. In the game history mode, important game history information about the game in dispute can be retrieved from a non-volatile storage on the gaming machine and displayed in some manner to a display on the gaming machine. The game history information is used to reconcile the dispute.

During the game presentation, the master gaming controller 924 may select and capture certain frames to provide a game history. These decisions are made in accordance with particular game code executed by controller 924. The captured frames may be incorporated into game history frames. Typically, one or more frames critical to the game presentation are captured. For instance, in a video slot game presentation, a game presentation frame displaying the final position of the reels is captured. In a video blackjack game, a frame corresponding to the initial cards of the player and dealer, frames corresponding to intermediate hands of the player and dealer and a frame corresponding to the final hands of the player and the dealer may be selected and captured as specified by the master gaming controller. Details of frame capture for game history applications are provided in U.S. Pat. No. 6,863,608, which is incorporated herein in its entirety and for all purposes.

In general, the gaming machine 2 maintains transaction logs of all events and game play. In some embodiments, as described above, the gaming machine may generate and store video frames as a game history record. The video frames may correspond to gaming information displayed on the wireless game player 725. During a wireless game play session, when the wireless game player 725 stops responding to the gaming machine 2, the game presented on the wireless game player 725 stops. The wireless game player 725 may stop responding to the gaming machine 2 because the wireless game player 725 is out-of-area reception, a battery level is low on the wireless game player, a power failure on the gaming machine 2 and other factors. To continue an interrupted game, the wireless game player 725 may ping the gaming machine 2 to reestablish communications and start the verification and authentication cycle as previously described. In the case of a dispute, the player may have to return to the gaming machine 2 so that game history records on the gaming machine can be accessed.

Figure 10:
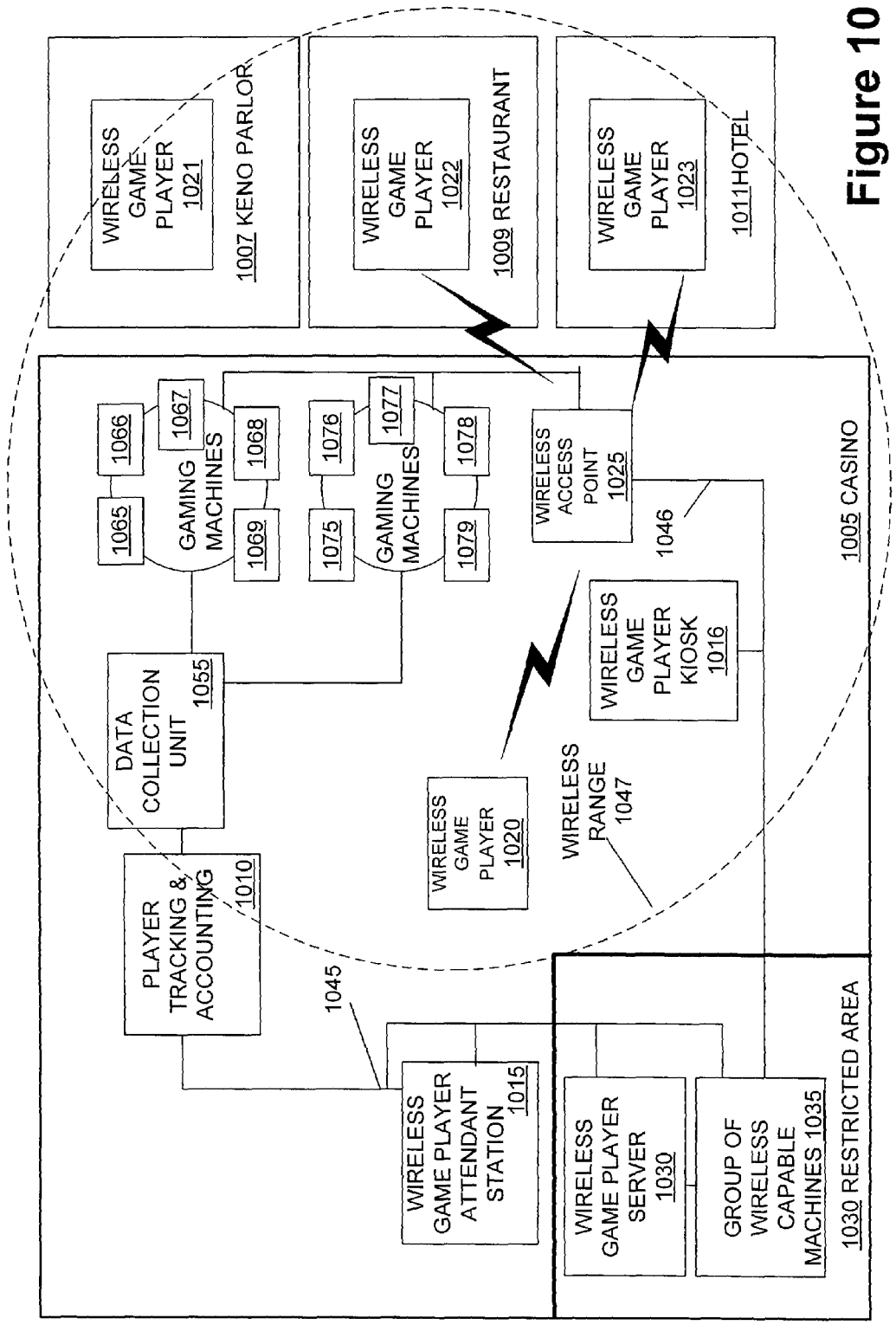
FIG. 10 is a block diagram of a network of gaming machines and wireless game players.

FIG. 10 is a block diagram of a network of gaming machines and wireless game players. Gaming machines 1065, 1066, 1067, 1068, 1069, 1075, 1076, 1077, 1078 and 1079, located in a floor area of casino 1005, support wireless game play and are connected to a wireless access point 1025. The gaming machines 1065, 1066, 1067, 1068, 1069, 1075, 1076, 1077, 1078 and 1079 are also connected to a player tracking system 1010 via a data collection unit 1055. Thus, game play on a wireless game player, such as 1020, in communication with one of the gaming machines on the casino floor may generate player tracking points. Further, a player using a game player, such as 1020, may be able to utilize services traditionally offered through player tracking devices on gaming machines such as a drink request. To provide the player tracking services, a player tracking service interface may be displayed on the touch screen of the wireless game player. Details of player tracking services and other gaming services that may be provided through a wireless game player of the present invention are described in U.S. Pat. No. 6,908,387, which is incorporated herein in its entirety and for all purposes.

The gaming machines located on the casino floor may also be connected to other remote servers such as but not limited to cashless system servers, progressive game servers, bonus game servers, prize servers, Internet, an entertainment content server, a concierge service server and a money transfer server and the like. Game services offered by the remote servers connected to the gaming machines may also be offered on wireless game players such as 1020. For instance, a game player may participate in a progressive game using the wireless game player 1020. In another example, a game player may be able to perform a cashless transaction enabled by a cashless system, such as the EZPAY™ cashless system (IGT, Reno Nev.), using a wireless game player.

In one embodiment, the gaming machines 1065, 1066, 1067, 1068, 1069, 1075, 1076, 1077, 1078 and 1079 connected to the access point 1025 are each provided with a wireless game player, such as 1020, 1021, 1022 and 1023. The gaming machines use a common wireless access point

1025. In this case, the access point device is also a multi-port switch. So, each machine has an Ethernet connection to the access point 1025.

In another embodiment of the present invention, an antenna may be built into a candle located on top of a gaming machine or some other location in the gaming machine. The antenna may be used as a wireless access point for wireless game play on one or more gaming machines. As an example, an antenna may be installed in the candle of gaming machine 1067 to be used as a wireless access point for wireless game play on gaming machines 1065, 1066, 1067, 1068 and 1069. A single gaming machine with an antenna may be used as part of a larger network of gaming devices providing wireless game play or may be used independently of a larger network.

To obtain a wireless game player on one of the gaming machines on the casino floor, a player may request a wireless game player via a service call on the gaming machine such as through the player tracking system. The request may go to a remote location, such as a terminal at a wireless game player attendant station 1015 and an attendant may then bring a wireless game player to the gaming machine where the request for wireless game play has been made. The request may be routed to the attendant station 1015 via the wireless game player server 1030. When a wireless game player server 1030 is not used, the request may be sent directly to the attendant station 1015. As another example, when a request for wireless game play is made, a light on the gaming machine such as the candle on top of the gaming machine may be activated. In this case, a passing attendant may bring the game player a wireless game player. In yet another embodiment, a player may make a request for a wireless game player on a terminal at a wireless game player kiosk 1016.

Prior to enabling the network connection for the wireless game play, a person or a system program may determine the customer is eligible to use the wireless game player and verify their eligibility. For instance, most gaming jurisdictions include age eligibility rules which must be obeyed. As another example, eligibility to use a wireless game player may be based upon a player's value to a casino such as a status in a player tracking club. When authentication is required, the information is loaded from the system (could be a smart-card reader on the gaming machine) or a message appears on the gaming machine instructing the customer to provide information. For example, the gaming machines could have a fingerprint sensor located on the front panel or another biometric device. When required, the gaming machine could instruct the customer that it needs a fingerprint image or other biometric information before the customer may use the wireless game player. Information obtained through biometric sensors located on the gaming machine may be compared with information contained in a customer's biometric file. In some embodiments, the biometric information file may be downloaded to the gaming machine from a remote server and the biometric comparison may be performed on the gaming machine, the gaming machine may send biometric information to a remote server where the biometric comparison is performed, or combinations thereof.

In some instances, gaming machines supporting wireless game players may be located in a high-roller area (e.g., very valued customers) and the machines may have a specially designed stand where the wireless game players are stored. The wireless game players may be enabled by an attendant or may automatically be enabled when the casino customer inserts their player-tracking card into the gaming machine (special customer). As with the gaming machines located on the casino floor, the player-tracking system or some other remote gaming device may download the customer's biometric file to the gaming machine or the gaming machines could have a fingerprint sensor located on the front panel. When required, the gaming machine may instruct the customer that it needs a fingerprint image before the customer use the wireless game player.

To establish remote operations on the wireless game player, the gaming machine may ping the wireless game player with a series of communications. In one embodiment, once this operation is completed, the game play is transferred to the wireless game player. The screen of the gaming machines may go black (perhaps with a out-of-service message) and all customer cash and switch controls are locked out (nobody can use them). The master gaming controller on the gaming machine will continue to play the games, perform all the outcome determination and cash transaction (bets & credits), and maintains all the meter information. However, all the front panel and display data is channeled to the wireless game player. In one embodiment, when the gaming machines credit balance reaches zero, the customer is required to return to the gaming machine and insert more money. To enter more money, first, the local gaming machine controls are activated by the player or an attendant. In jurisdictions where the customer can use a debit or smart card to add money to a gaming machine, a card reader (smart card) connected to the wireless game player may be used to perform this function. In general, during a wireless game play session, the gaming machine communicates continuously with the wireless game player. In one embodiment, a web browser is used to display input switch commands. The displayed information on the wireless game player may come over from the gaming machine as HTML page information. Therefore, the wireless game player may use web-based transactions.

Additional details of a wireless game play network are described in the following paragraphs. The wireless game play network is shown in FIG. 10 is only one example of many possible embodiments of the present invention. The gaming machines and other gaming devices supporting wireless game play on wireless game players comprise a wireless game play network. The wireless game play network may be a part of a larger system network. The larger system network may provide the capability for a large number of gaming machines throughout a casino to be on the same wireless game play network. High-gain antennas and repeaters may be used to expand the range of the wireless game players allowing them to work in all areas of a casino/hotel complex, including hotels rooms and pool area. Racetracks, large bingo parlors and special outdoor events may also be covered within the wireless game play network allowing wireless game play in these areas.

The wireless game play network may also include wired access points that allow a wireless game player to be plugged directly into the network. For example, a wireless game player may include an Ethernet connector that may be directly plugged into the network segment 1046. The direct network connectors may be provided with cradles used to charge the wireless game player. The charging cradles may be located at many locations within the wireless game play network.

In FIG. 10, the range of the wireless access point 1025 is denoted by a circle 1047 used in the wireless game play network. Many such access points may be used in a wireless game play network depending upon the network topography. For instance, due the size of a particular casino and the area covered by a single access point, there could be other access points used as repeaters located throughout the casino and hotel. In addition, the wireless access point could also be connected to an existing network. After receiving an active wireless game player, a player may use the wireless game player in the areas of casino 1005 within the circle 1047. Further, the player may use the wireless game player, if approved by a local gaming jurisdiction, in the areas of a keno parlor 1007, a restaurant 1009, and a hotel 1011, which are within the circle 1047. While using the wireless game player, a player may wander to different locations within circle 1047 such as from the casino 1005 to the restaurant 1009.

In general, wireless game play in the wireless game play network is enabled by gaming devices executing licensed and regulated gaming software. However, the gaming devices supporting wireless game play are not limited gaming machines, such as 1065, 1066, 1067, 1068, 1069, 1075, 1076, 1077, 1078 and 1079 located on a casino floor. Special wireless-only gaming machines 1035 mounted in racks or containers connected to a wireless gaming network may be used to support wireless game play using wireless game players. The wireless-only gaming machines 1035 may not offer local game play. For instance, the wireless-only gaming machines 1035 may not include display screens. However, the wireless-only gaming machines are still regulated and licensed in a manner similar to traditional gaming machines. As another example, a wireless game player server 1030 with multiple processors may be used to support simultaneous game play on a plurality of wireless game players. The wireless-only gaming machines 1035 and the wireless game play server 1030 may be located in a restricted area 1030 of the casino 1005 and may not be generally accessible to game players.

The wireless-only gaming machines 1035 and wireless game play server 1030 are connected the wireless access point 1025 via a connection 1046. The wireless-only gaming machines 1035 and wireless game play server are also in communication with a wireless game player attendant station 1015 and the player tracking and accounting server 1010 via network connection 1045. The wireless-only gaming machine and wireless game player server 1030 may also be connected to other remote gaming devices such as progressive servers, cashless system servers, bonus servers, prize servers and the like.

When using a wireless-only gaming machine, the customer may use a kiosk, such as 1016 or a cashier to enter cash and provide authentication information for a wireless game play session using a wireless game player. Then, the customer may be assigned a wireless game player, such as 1020, 1021, 1022 and 1023, in communication with one of the wireless-only gaming machines 1035 or the wireless game play server 1030. Once authenticated and verified, the customer may select a game and begin playing the wireless game player. There may be wireless game play cradles in the keno parlor 1022, restaurant 1009 or Racebook areas, allowing the customer to play their favorite casino machine game and at the same time make keno or Racebook bets or eat. In addition, the wireless game play cradles may be used to charge batteries on the wireless game player and may also be used to provide an additional network access point such as through a wire connection provided on the cradle. The wireless game player may also be used for Racebook and Keno betting. Thus, a player may watch a horserace or see the results of a certain event on the display of the wireless game player.

Finally, the wireless game player may also be used for other activities besides gaming. For example, because of the authentication and verification (security) features, the wireless game player could be safe way to conduct monetary transactions such as electronic funds transfers. As another example, the wireless game player may be used for video teleconferencing to visually connect to a casino host or to provide instant messaging services. In addition, when the wireless game player supports web-based browsers and the wireless game play network includes Internet access, the wireless game player may be used to obtain any web-based services available over the Internet.

Figure 11:
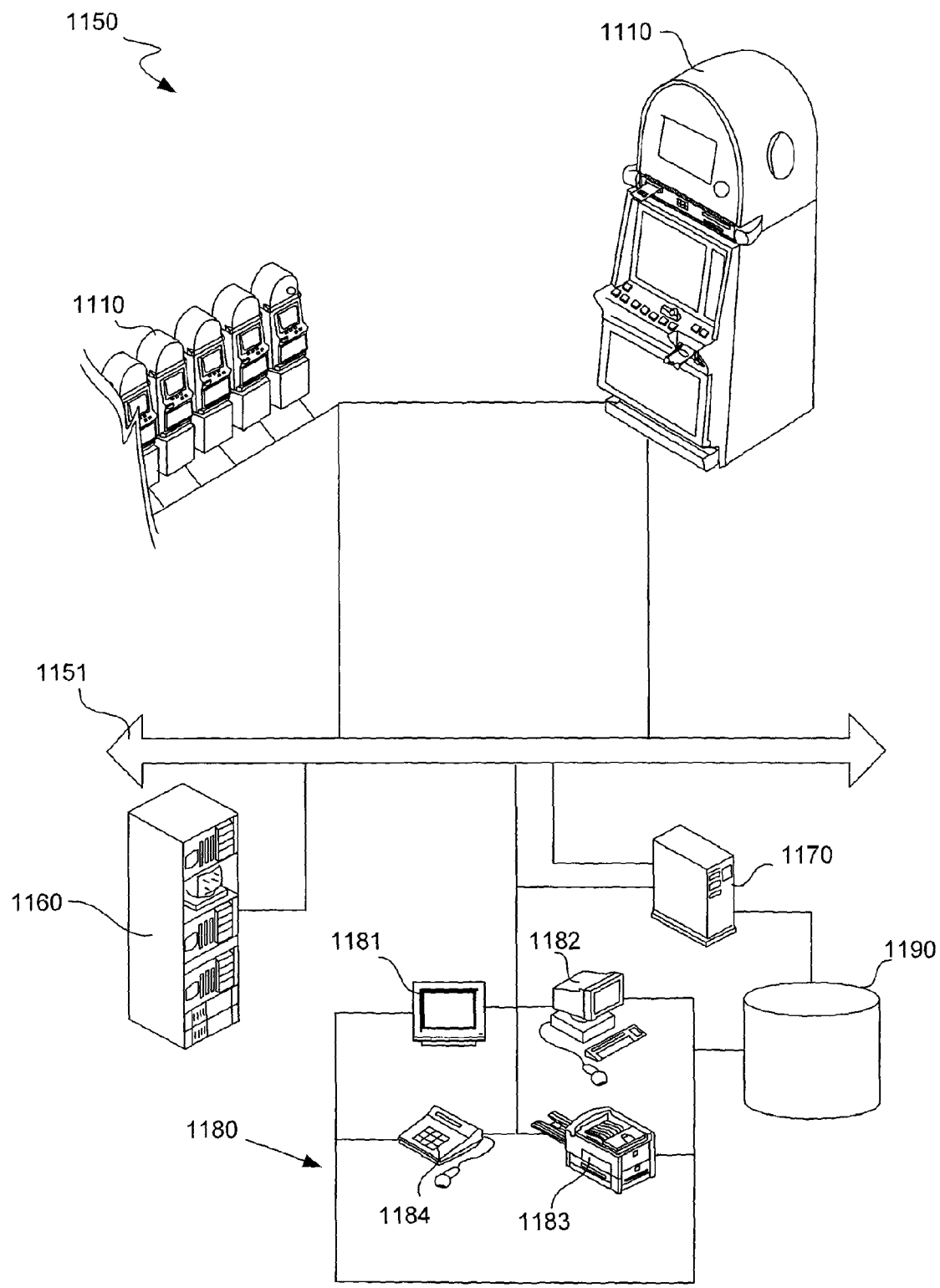
FIG. 11 illustrates in block diagram format an exemplary network infrastructure.

Referring now to FIG. 11, an exemplary network infrastructure for providing a gaming system having one or more gaming machines is illustrated in block diagram format. Exemplary gaming system 1150 has one or more gaming machines, various communication items, and a number of host-side components and devices adapted for use within a gaming environment. As shown, one or more gaming machines 1110 adapted for use in gaming system 1150 can be in a plurality of locations, such as in banks on a casino floor or standing alone at a smaller non-gaming establishment, as desired. Common bus 1151 can connect one or more gaming machines or devices to a number of networked devices on the gaming system 1150, such as, for example, a general-purpose server 1160, one or more special-purpose servers 1170, a sub-network of peripheral devices 1180, and/or a database 1190.

A general-purpose server 1160 may be one that is already present within a casino or other establishment for one or more other purposes beyond any monitoring or administering involving gaming machines. Functions for such a general-purpose server can include other general and game specific accounting functions, payroll functions, general Internet and e-mail capabilities, switchboard communications, and reservations and other hotel and restaurant operations, as well as other assorted general establishment record keeping and operations. In some cases, specific gaming related functions such as cashless gaming, downloadable gaming, player tracking, remote game administration, video or other data transmission, or other types of functions may also be associated with or performed by such a general-purpose server. For example, such a server may contain various programs related to cashless gaming administration, player tracking operations, specific player account administration, remote game play administration, remote game player verification, remote gaming administration, downloadable gaming administration, and/or visual image or video data storage, transfer and distribution, and may also be linked to one or more gaming machines, in some cases forming a network that includes all or many of the gaming devices and/or machines within the establishment. Communications can then be exchanged from each adapted gaming machine to one or more related programs or modules on the general-purpose server.

In one embodiment, gaming system 1150 contains one or more special-purpose servers that can be used for various functions relating to the provision of cashless gaming and gaming machine administration and operation under the present methods and systems. Such a special-purpose server or servers could include, for example, a cashless gaming server, a player verification server, a general game server, a downloadable games server, a specialized accounting server, and/or a visual image or video distribution server, among others. Of course, these functions may all be combined onto a single specialized server. Such additional special-purpose servers are desirable for a variety of reasons, such as, for example, to lessen the burden on an existing general-purpose server or to isolate or wall off some or all gaming machine administration and operations data and functions from the general-purpose server and thereby increase security and limit the possible modes of access to such operations and information.

Alternatively, exemplary gaming system 1150 can be isolated from any other network at the establishment, such that a general-purpose server 1160 is essentially impractical and unnecessary. Under either embodiment of an isolated or shared network, one or more of the special-purpose servers are preferably connected to sub-network 1180, which might be, for example, a cashier station or terminal. Peripheral devices in this sub-network may include, for example, one or more video displays 1181, one or more user terminals 1182, one or more printers 1183, and one or more other input devices 1184, such as a ticket validator or other security identifier, among others. Similarly, under either embodiment of an isolated or shared network, at least the specialized server 1170 or another similar component within a general-purpose server 1160 also preferably includes a connection to a database or other suitable storage medium 1190. Database 1190 is preferably adapted to store many or all files containing pertinent data or information regarding cashless instruments such as tickets, among other potential items. Files, data and other information on database 1190 can be stored for backup purposes, and are preferably accessible at one or more system locations, such as at a general-purpose server 1160, a special purpose server 1170 and/or a cashier station or other sub-network location 1180, as desired.

While gaming system 1150 can be a system that is specially designed and created new for use in a casino or gaming establishment, it is also possible that many items in this system can be taken or adopted from an existing gaming system. For example, gaming system 1150 could represent an existing cashless gaming system to which one or more of the inventive components or program modules are added. In addition to new hardware, new functionality via new software, modules, updates or otherwise can be provided to an existing database 1190, specialized server 1170 and/or general-purpose server 1160, as desired. In this manner, the methods and systems of the present invention may be practiced at reduced costs by gaming operators that already have existing gaming systems, such as an existing EZ Pay® or other cashless gaming systems, by simply modifying the existing system. Other modifications to an existing system may also be necessary, as might be readily appreciated.

The various aspects, features, embodiments or implementations of the invention described above can be used alone or in various combinations.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

We claim:

1. A method for authenticating one or more entities in a gaming environment that provides one or more games, said method comprising:
    causing at least one processor to execute a plurality of instructions stored in at least one memory device to operate with at least one input device to:
        store, in a database, one or more attribute values for one or more attributes associated with at least one input provided in connection with at least one image provided for authentication of said one or more entities;
        wherein a first of the one or more attribute values includes one or more of the following:
            a velocity or speed associated with creating or tracing said at least one image;
            an acceleration associated with creating or tracing said at least one image;
            time taken to create or trace said at least one image; and
            pressure associated with creating or tracing said at least one image; and
        authenticate, by the at least one processor, said one or more entities based on said one or more attribute values associated with said at least one image.

2. A method as recited in claim 1, wherein said method further comprises:
    causing the at least one processor to execute the plurality of instructions to:
        store, on a database, one or more other attribute values for said one or more attributes associated with said at least one image and/or one or more other attributes also associated with said at least one image and/or another image provided for authentication of said one or more entities; and
        authenticate, by the at least one processor, said one or more entities based on said one or more other attribute values.

3. A method as recited in claim 2, wherein causing the at least one processor to execute the plurality of instructions to authenticate said one or more entities further comprises:
    causing the at least one processor to execute the plurality of instructions to compare, by the at least one processor, said one more attribute values to said other one or more attribute values to determine whether the difference is within an acceptable range.

4. A computing system operable in a computing environment, wherein said computing system is configured to:
    receive and store, on a database, one or more attribute values for one or more attributes associated with the manner in which at least one image has been created or traced, wherein said at least one image is provided for authentication of one or more entities in said computing environment;
    wherein a first of the one or more attribute values includes one or more of the following:
        a velocity or speed associated with creating or tracing said at least one image;
        an acceleration associated with creating or tracing said at least one image;
        time taken to create or trace said at least one image; and
        pressure associated with creating or tracing said at least one image; and
    authenticate, by at least one processor, said one or more entities based on said one or more attribute values associated with the manner in which said at least one image has been created and/or traced.

5. A computing system as recited in claim 4, wherein said computing system is further configured to: determine said one or more attribute values when said at least one image is created and/or traced by said one or more entities.

6. A computing system as recited in claim 4, wherein said computing system is further configured to: measure, by the at least one processor, said one or more attribute values as said at least one image is being created or traced by one or more persons being authenticated prior to authentication for using resources or services of said computing environment.

7. A computing system as recited in claim 4, wherein said computing system is further configured to:
  determine, by the at least one processor, one or more other attribute values associated with the manner said at least one image and/or another one or more images has been created or traced; and
  authenticate, by the at least one processor, said one or more entities based on said one or more other attribute values.

8. A computing system as recited in claim 7, wherein to authenticate said one or more entities, the computing system is further configured to: compare, by the at least one processor, said one or more attribute values to said one or more other attribute values.

9. A computing system as recited in claim 4, wherein said computing system is further configured to: measure, by the at least one processor, said one or more other attribute values when said at least one image and/or at least one other image is created or traced by said one or more entities.

10. A computing system as recited in claim 9,
  wherein said one or more entities includes a person to be authenticated, and
  wherein said at least one image or said at least one other image does not include any personal information about said person or identifies said person.

11. A computing system as recited in claim 9, wherein said computing system is further configured to measure, by the at least one processor, said one or more attribute values as a person creates or traces said at least one image.

12. A computing system as recited in claim 11, wherein said at least one image does not include a signature of said person, provide personal information about said person, or identify said person.

13. A computer-implemented method for authenticating one or more entities, said computer-implemented method comprising:
  causing at least one processor to execute a plurality of instructions stored in at least one memory device to operate with at least one input device to:
    receive, by the at least one processor, one or more attribute values for one or more attributes associated with the manner in which at least one image has been created or traced, wherein said at least one image is provided for authentication of one or more entities in computing environment;
    wherein a first of the one or more attribute values includes one or more of the following:
      a velocity or speed associated with creating or tracing said at least one image;
      an acceleration associated with creating or tracing said at least one image;
      time taken to create or trace said at least one image; and
      pressure associated with creating or tracing said at least one image; and
    authenticate, by the at least one processor, said one or more entities based on said one or more attribute values associated with the manner in which said at least one image has been created or traced.

14. A non-transitory computer readable medium including computer program code for authenticating one or more entities, said non-transitory computer readable medium comprising:
  first computer program code for receiving one or more attribute values for one or more attributes associated with the manner in which at least one image has been created and/or traced, wherein said at least one image is provided for authentication of one or more entities in computing environment;
    wherein a first one or more attribute values includes one or more of the following:
      a velocity or speed associated with creating or tracing said at least one image;
      an acceleration associated with creating or tracing said at least one image;
      time taken to create or trace said at least one image; and
      pressure associated with creating or tracing said at least one image; and
  second computer program code for authenticating said one or more entities based on said one or more attribute values associated with the manner in which said at least one image has been created and/or traced.

15. A computer-implemented method for registering one or more entities for subsequent authentication of said one or more entities, said computer-implemented method comprising:
  causing at least one processor to execute a plurality of instructions stored in at least one memory device to operate with at least one input device to:
    determine, by the at least one processor, one or more attribute values for one or more attributes associated with the manner in which at least one image has been created or traced, wherein said at least one image is provided for authentication of one or more entities in computing environment;
    wherein a first of the one or more attribute values include one or more of the following:
      a velocity or speed associated with creating or tracing said at least one image;
      an acceleration associated with creating or tracing said at least one image;
      time taken to create or trace said at least one image; and
      pressure associated with creating or tracing said at least one image; and
    save, on a database, said one or more attribute values for subsequent authentication of said one or more one or more.

16. A computing system configured to operate in a computing environment, wherein said computing system is configured to:
  determine, by at least one processor, one or more attribute values for one or more attributes associated with the manner in which at least one image has been created or traced, wherein said at least one image is provided for authentication of one or more entities in computing environment;
  wherein a first of the one or more attribute values include one or more of the following:
    a velocity or speed associated with creating or tracing said at least one image;
    an acceleration associated with creating or tracing said at least one image;
    time taken to create or trace said at least one image; and
    pressure associated with creating or tracing said at least one image; and
  save, on a database, said one or more attribute values for subsequent authentication of said one or more one or more.

17. The method as recited in claim 1, wherein said method further includes:
- causing a first processor to store, in a database, the one or more attribute values for the one or more attributes associated with the at least one input provided in connection with the at least one image provided for authentication of said one or more entities, and
- causing a second, different, processor to authenticate said one or more entities based on said one or more attribute values associated with said at least one image.

18. A computer-implemented method as recited in claim 13, wherein said method further includes:
- causing a first processor to receive the one or more attribute values for the one or more attributes associated with the manner in which the at least one image has been created or traced, and
- causing a second, different, processor to authenticate said one or more entities based on said one or more attribute values associated with the manner in which said at least one image has been created or traced.

\* \* \* \* \*